US009866392B1

(12) United States Patent
Campagna et al.

(10) Patent No.: US 9,866,392 B1
(45) Date of Patent: Jan. 9, 2018

(54) DISTRIBUTED SYSTEM WEB OF TRUST PROVISIONING

(71) Applicant: Amazon Technologies, Inc., Reno, NV (US)

(72) Inventors: Matthew John Campagna, Bainbridge Island, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/486,741

(22) Filed: Sep. 15, 2014

(51) Int. Cl.
*H04L 9/32* (2006.01)
*H04L 9/14* (2006.01)

(52) U.S. Cl.
CPC .............. *H04L 9/3247* (2013.01); *H04L 9/14* (2013.01)

(58) Field of Classification Search
None
See application file for complete search history.

(56) References Cited

U.S. PATENT DOCUMENTS

| 4,868,877 | A | 9/1989 | Fischer |
| 4,918,728 | A | 4/1990 | Matyas et al. |
| 5,146,498 | A | 9/1992 | Smith |
| 5,201,000 | A | 4/1993 | Matyas et al. |
| 5,465,299 | A | 11/1995 | Matsumoto et al. |
| 5,495,533 | A | 2/1996 | Linehan et al. |
| 5,826,245 | A | 10/1998 | Sandberg-Diment |
| 5,862,220 | A | 1/1999 | Perlman |
| 6,012,144 | A | 1/2000 | Pickett |
| 6,199,162 | B1 | 3/2001 | Luyster |
| 6,240,187 | B1 | 5/2001 | Lewis |
| 6,253,323 | B1* | 6/2001 | Cox ..................... H04L 9/3247 |
| | | | 713/168 |
| 6,356,941 | B1 | 3/2002 | Cohen |
| 6,546,492 | B1 | 4/2003 | Walker et al. |
| 6,816,595 | B1 | 11/2004 | Kudo |
| 7,490,248 | B1 | 2/2009 | Valfridsson et al. |
| 7,565,419 | B1 | 7/2009 | Kwiatkowski et al. |

(Continued)

FOREIGN PATENT DOCUMENTS

| CN | 1740944 | 3/2006 |
| CN | 101281578 | 10/2008 |

(Continued)

OTHER PUBLICATIONS

Roth, G.B., et al., "Device Coordination," U.S. Appl. No. 13/916,915, filed Jun. 13, 2013.

(Continued)

*Primary Examiner* — Dede Zecher
*Assistant Examiner* — Richard A McCoy
(74) *Attorney, Agent, or Firm* — Davis Wright Tremaine LLP

(57) ABSTRACT

A web of trust in a distributed system is established. A root of trust for at least two components in the distributed system validates information for the distributed system. The validated information is then used to create additional information for the distributed system. Versions of the information are usable to validate subsequent versions of the information such that validation of a version of the information can be performed by using one or more previous versions to verify that the version is a valid successor of a previously validated previous version.

24 Claims, 13 Drawing Sheets

(56) References Cited

U.S. PATENT DOCUMENTS

| | | |
|---|---|---|
| 7,620,680 B1 | 11/2009 | Lamport |
| 7,774,826 B1 | 8/2010 | Romanek et al. |
| 7,865,446 B2 | 1/2011 | Armingaud et al. |
| 7,877,607 B2 | 1/2011 | Circenis et al. |
| 7,894,604 B2 | 2/2011 | Nishioka et al. |
| 7,953,978 B2 | 5/2011 | Greco et al. |
| 8,024,562 B2 | 9/2011 | Gentry et al. |
| 8,024,582 B2 | 9/2011 | Kunitz et al. |
| 8,065,720 B1 | 11/2011 | Ebrahimi et al. |
| 8,091,125 B1 | 1/2012 | Hughes et al. |
| 8,111,828 B2 | 2/2012 | Raman et al. |
| 8,140,847 B1 | 3/2012 | Wu |
| 8,213,602 B2 | 7/2012 | Mamidwar |
| 8,245,037 B1 | 8/2012 | Durgin et al. |
| 8,251,283 B1 | 8/2012 | Norton |
| 8,261,320 B1 | 9/2012 | Serenyi et al. |
| 8,295,492 B2 | 10/2012 | Suarez et al. |
| 8,296,835 B2 | 10/2012 | Calamera et al. |
| 8,302,170 B2 | 10/2012 | Kramer et al. |
| 8,544,084 B2 | 9/2013 | Owen et al. |
| 8,588,426 B2 | 11/2013 | Xin et al. |
| 8,607,358 B1 | 12/2013 | Shankar et al. |
| 8,713,311 B1 | 4/2014 | Roskind |
| 8,751,807 B2 | 6/2014 | Ma et al. |
| 8,804,950 B1 | 8/2014 | Panwar |
| 8,812,844 B2 | 8/2014 | Chambers et al. |
| 8,904,181 B1 | 12/2014 | Felsher et al. |
| 8,989,379 B2 | 3/2015 | Katar et al. |
| 9,031,240 B2 | 5/2015 | Yang et al. |
| 9,135,408 B2 * | 9/2015 | Chu ........................ G06F 21/10 |
| 2001/0052071 A1 | 12/2001 | Kudo et al. |
| 2002/0076044 A1 | 6/2002 | Pires |
| 2002/0141590 A1 | 10/2002 | Montgomery |
| 2003/0081790 A1 | 5/2003 | Kallahalla et al. |
| 2003/0084290 A1 | 5/2003 | Murty et al. |
| 2003/0093694 A1 | 5/2003 | Medvinsky et al. |
| 2003/0131238 A1 | 7/2003 | Vincent |
| 2003/0163701 A1 | 8/2003 | Ochi et al. |
| 2003/0172269 A1 | 9/2003 | Newcombe |
| 2003/0188181 A1 | 10/2003 | Kunitz et al. |
| 2003/0188188 A1 | 10/2003 | Padmanabhan et al. |
| 2004/0009815 A1 | 1/2004 | Zotto et al. |
| 2004/0093499 A1 | 5/2004 | Arditi et al. |
| 2004/0107345 A1 | 6/2004 | Brandt et al. |
| 2004/0143733 A1 | 7/2004 | Ophir et al. |
| 2004/0193915 A1 | 9/2004 | Smith et al. |
| 2004/0223608 A1 | 11/2004 | Oommen et al. |
| 2005/0010760 A1 | 1/2005 | Goh et al. |
| 2005/0050317 A1 | 3/2005 | Kramer et al. |
| 2005/0120232 A1 | 6/2005 | Hori et al. |
| 2005/0165859 A1 | 7/2005 | Geyer et al. |
| 2005/0246778 A1 | 11/2005 | Usov et al. |
| 2006/0010323 A1 | 1/2006 | Martin et al. |
| 2006/0018468 A1 | 1/2006 | Toba et al. |
| 2006/0021018 A1 | 1/2006 | Hinton et al. |
| 2006/0204003 A1 | 9/2006 | Takata et al. |
| 2006/0206932 A1 | 9/2006 | Chong |
| 2006/0288232 A1 | 12/2006 | Ho et al. |
| 2006/0291664 A1 | 12/2006 | Suarez et al. |
| 2007/0033637 A1 | 2/2007 | Yami et al. |
| 2007/0050641 A1 | 3/2007 | Flynn et al. |
| 2007/0140480 A1 | 6/2007 | Yao |
| 2007/0180153 A1 | 8/2007 | Cornwell et al. |
| 2007/0230706 A1 | 10/2007 | Youn |
| 2007/0283446 A1 | 12/2007 | Yami et al. |
| 2008/0019516 A1 | 1/2008 | Fransdonk |
| 2008/0019527 A1 | 1/2008 | Youn et al. |
| 2008/0025514 A1 | 1/2008 | Coombs |
| 2008/0046984 A1 | 2/2008 | Bohmer et al. |
| 2008/0082827 A1 | 4/2008 | Agrawal et al. |
| 2008/0084996 A1 | 4/2008 | Chen et al. |
| 2008/0091941 A1 * | 4/2008 | Yonezawa .............. H04L 9/3255 |
| | | 713/158 |
| 2008/0112561 A1 | 5/2008 | Kim |
| 2008/0127279 A1 | 5/2008 | Futa et al. |
| 2008/0172562 A1 | 7/2008 | Cachin et al. |
| 2008/0247540 A1 | 10/2008 | Ahn et al. |
| 2008/0298590 A1 | 12/2008 | Katar et al. |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0158033 A1 | 6/2009 | Jeong et al. |
| 2009/0165076 A1 | 6/2009 | DeCusatis et al. |
| 2009/0245519 A1 | 10/2009 | Cachin et al. |
| 2009/0276514 A1 | 11/2009 | Subramanian |
| 2009/0300356 A1 | 12/2009 | Crandell |
| 2010/0008499 A1 | 1/2010 | Lee et al. |
| 2010/0014662 A1 | 1/2010 | Jutila |
| 2010/0017626 A1 | 1/2010 | Sato et al. |
| 2010/0138218 A1 | 6/2010 | Geiger |
| 2010/0153670 A1 | 6/2010 | Dodgson et al. |
| 2010/0185863 A1 | 7/2010 | Rabin et al. |
| 2010/0211781 A1 | 8/2010 | Auradkar et al. |
| 2010/0228961 A1 * | 9/2010 | Burns .................... H04L 45/04 |
| | | 713/150 |
| 2010/0266132 A1 | 10/2010 | Bablani et al. |
| 2010/0303241 A1 | 12/2010 | Breyel |
| 2010/0316219 A1 | 12/2010 | Boubion et al. |
| 2010/0325732 A1 | 12/2010 | Mittal et al. |
| 2011/0022642 A1 | 1/2011 | deMilo et al. |
| 2011/0066847 A1 | 3/2011 | Christensen et al. |
| 2011/0072264 A1 | 3/2011 | McNulty |
| 2011/0099362 A1 | 4/2011 | Haga et al. |
| 2011/0116636 A1 | 5/2011 | Steed |
| 2011/0154057 A1 | 6/2011 | England et al. |
| 2011/0173435 A1 | 7/2011 | Liu et al. |
| 2011/0178933 A1 | 7/2011 | Bailey |
| 2011/0191462 A1 | 8/2011 | Smith |
| 2011/0213971 A1 | 9/2011 | Gurel et al. |
| 2011/0246765 A1 | 10/2011 | Schibuk |
| 2011/0258443 A1 | 10/2011 | Barry |
| 2012/0079289 A1 | 3/2012 | Weng et al. |
| 2012/0096272 A1 | 4/2012 | Jasper et al. |
| 2012/0134495 A1 | 5/2012 | Liu |
| 2012/0140923 A1 | 6/2012 | Lee et al. |
| 2012/0191979 A1 | 7/2012 | Feldbau |
| 2012/0198042 A1 | 8/2012 | Dunbar et al. |
| 2012/0204032 A1 | 8/2012 | Wilkins et al. |
| 2012/0260094 A1 | 10/2012 | Asim et al. |
| 2012/0266218 A1 | 10/2012 | Mattsson |
| 2012/0290850 A1 | 11/2012 | Brandt et al. |
| 2012/0291101 A1 | 11/2012 | Ahlstrom et al. |
| 2012/0297183 A1 | 11/2012 | Mukkara et al. |
| 2012/0300936 A1 | 11/2012 | Green |
| 2012/0303961 A1 | 11/2012 | Kean et al. |
| 2012/0311675 A1 | 12/2012 | Ham et al. |
| 2012/0314854 A1 | 12/2012 | Waters |
| 2012/0321086 A1 | 12/2012 | D'Zouza et al. |
| 2012/0323990 A1 | 12/2012 | Hayworth |
| 2013/0003966 A1 | 1/2013 | Ihle et al. |
| 2013/0031255 A1 | 1/2013 | Maloy et al. |
| 2013/0044878 A1 | 2/2013 | Rich et al. |
| 2013/0111217 A1 | 5/2013 | Kopasz et al. |
| 2013/0157619 A1 | 6/2013 | Di Luoffo et al. |
| 2013/0159732 A1 | 6/2013 | Leoutsarakos |
| 2013/0163753 A1 | 6/2013 | MacMillan et al. |
| 2013/0198521 A1 | 8/2013 | Wu |
| 2013/0316682 A1 | 11/2013 | Vieira |
| 2013/0326233 A1 | 12/2013 | Tolfmans |
| 2014/0012751 A1 | 1/2014 | Kuhn et al. |
| 2014/0122866 A1 | 5/2014 | Haeger et al. |
| 2014/0164774 A1 | 6/2014 | Nord et al. |
| 2014/0177829 A1 | 6/2014 | MacMillan et al. |
| 2014/0181513 A1 * | 6/2014 | Marek ................... H04L 63/062 |
| | | 713/168 |
| 2015/0127710 A1 * | 5/2015 | Ady ........................ H04W 4/206 |
| | | 709/202 |

FOREIGN PATENT DOCUMENTS

| | | |
|---|---|---|
| JP | 2000295209 | 10/2000 |
| JP | 2003188871 | 7/2003 |
| JP | 2005057417 | 3/2005 |
| JP | 2005258801 | 9/2005 |

(56) References Cited

FOREIGN PATENT DOCUMENTS

| | | |
|---|---|---|
| JP | 2005533438 | 11/2005 |
| JP | 2007081482 | 3/2007 |
| JP | 2007507760 | 3/2007 |
| JP | 2008015669 | 1/2008 |
| JP | 2008306418 | 12/2008 |
| JP | 2009213064 | 9/2009 |
| JP | 2009246800 | 10/2009 |
| JP | 2010128824 | 6/2010 |
| JP | 2011019129 | 1/2011 |
| JP | 2012073374 | 4/2012 |
| JP | 2014501955 | 1/2014 |
| KR | 101145766 | 5/2012 |
| WO | WO2010001150 | 1/2010 |
| WO | WO2011083343 | 7/2011 |
| WO | WO2012060979 | 5/2012 |

OTHER PUBLICATIONS

Roth, G.B., et al., "Session Negotiations," U.S. Appl. No. 13/916,964, filed Jun. 13, 2013.
Campagna, M.J., and G.B. Roth, "Web of Trust Management in a Distributed System," U.S. Appl. No. 14/284,278, filed May 21, 2014.
Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.
Bethencourt et al., "Ciphertext-Policy Attribute-Based Encryption," IEEE Symposium on Security and Privacy 2007, 15 pages.
Guttman et al., "An Introduction to Computer Security: The NIST Handbook," Special Publication 800-12, Oct. 1, 1995, Sections 17.6 and 18.3.2 and Section 19 for cryptographic tools, XP055298016, retrieved on Aug. 26, 2016, from http://www.davidsalomon.name/CompSec/auxiliary/handbook.pdf.
IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.
International Search Report and Written Opinion dated Apr. 29, 2014, in International Patent Application No. PCT/US2014/015404, filed Feb. 7, 2014.
International Search Report and Written Opinion dated May 28, 2014, in International Patent Application No. PCT/US2014/15697, filed Feb. 11, 2014.
International Search Report and Written Opinion dated May 30, 2014, in International Patent Application No. PCT/US2014/015408, filed Feb. 7, 2014.
International Search Report and Written Opinion dated May 30, 2014, in International Patent Application No. PCT/US2014/015410, filed Feb. 7, 2014.
International Search Report and Written Opinion dated May 30, 2014, International Patent Application No. PCT/US2014/015414, filed Feb. 7, 2014.
ISO/IEC 11889-1:2009 Information technology—Trusted Platform Module—Part 1: Overview.
ISO/IEC 11889-2:2009 Information technology—Trusted Platform Module—Part 2: Design Principles.
ISO/IEC 11889-3:2009 Information technology—Trusted Platform Module—Part 3: Structures.
ISO/IEC 11889-4:2009 Information technology—Trusted Platform Module—Part 4: Commands.
Krawczyk et al., "HMAC-based Extract- and-Expand Key Derivation Function (HKDF)," Internet Engineering Task Force (IETF), May 2010, retrieved Sep. 22, 2015, from https://tools.ietf.org/html/rfc5869, 14 pages.
NIST, "Implementation Guidance for FIPS PUB 140-1 and the Cryptographic Module Validation Program," Jan. 10, 2002, 63 pages.
NIST, "Implementation Guidance for FIPS PUB 140-2 and the Cryptographic Module Validation Program," Initial Release Mar. 28, 2003, 205 pages.
Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.
Sieloff, "The new systems administrator: The role of becoming root," Inside Solaris, Oct. 2002, 8(10):6-9.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Wikipedia, "IEEE P1363 an Institute of Electrical and Electronics Engineers (IEEE) standardization project for public-key cryptography," retrieved Sep. 22, 2015, from https://en.wikipedia.org/wiki/IEEE_P1363, 3 pages.
Wikipedia, "Key derivation function," retrieved Sep. 22, 2015, from https://en.wikipedia.org/wiki/Key_derivation_function, 4 pages.

\* cited by examiner

DISTRIBUTED SYSTEM WEB OF TRUST PROVISIONING

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging.

In some instances, data security is enhanced by a fleet of devices that share cryptographic material (e.g., a common set of cryptographic keys). However, as the complexity of such systems increases, the complexity of maintaining the cryptographic material secure increases accordingly. Further, as generally an issue in distributed systems, some nodes in a distributed system may have updated information that other nodes have yet to receive as, generally, propagation techniques take time to reach all nodes in a system. In some distributed systems, some nodes may communicate with other nodes on an intermittent basis, which can result in many updates being propagated to other nodes before the intermittently connected nodes receive updates. As a result, ensuring the integrity of updates propagated throughout a distributed system can present numerous challenges whose difficulty of addressing increases with the complexity of the systems.

BRIEF DESCRIPTION OF THE DRAWINGS

Various embodiments in accordance with the present disclosure will be described with reference to the drawings, in which.

DETAILED DESCRIPTION

Figure 1:
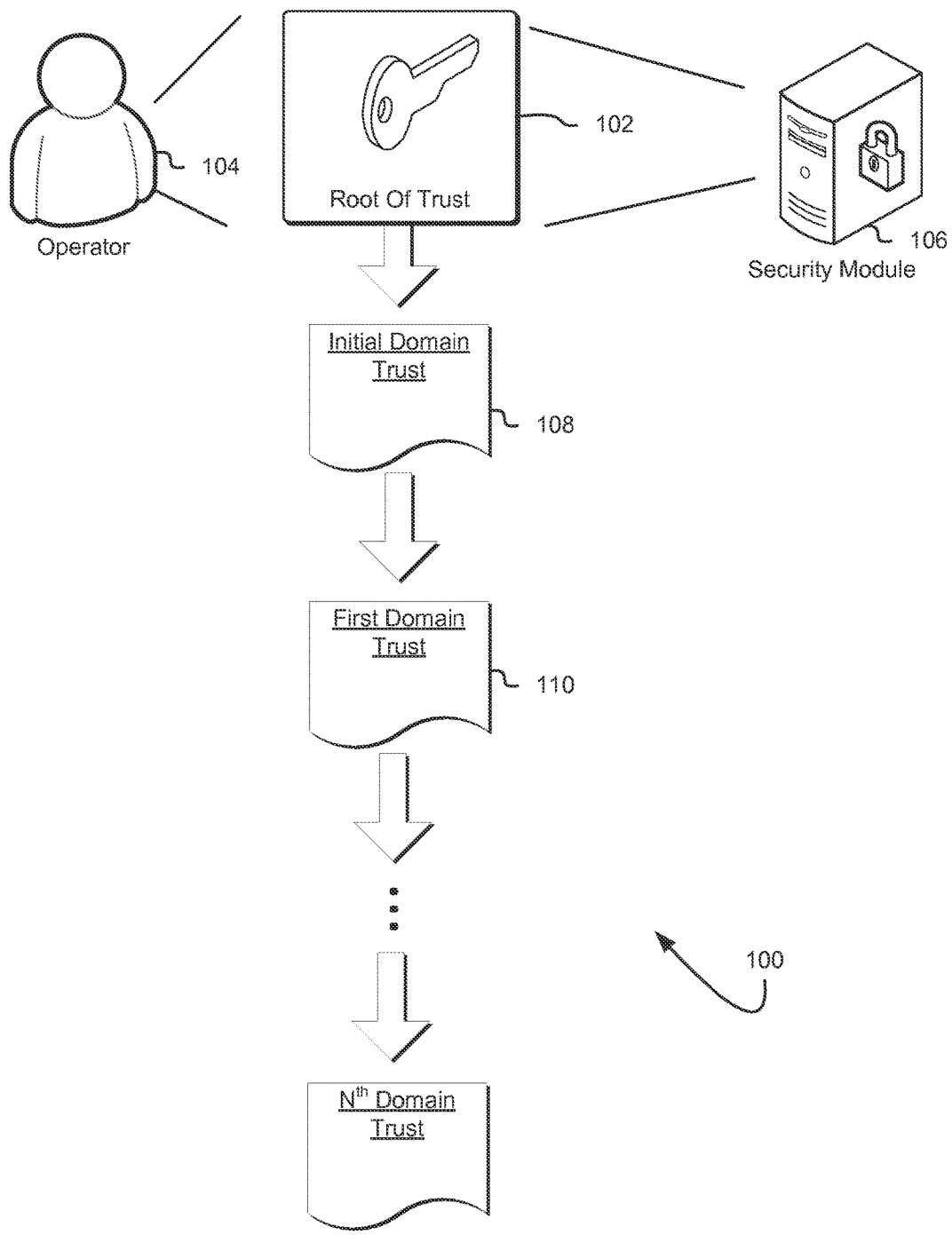
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the secure update of information throughout a distributed system. In an embodiment, a distributed system comprises multiple nodes, each of which plays a role in the distributed system and some of which play redundant roles in the distributed system. In some examples, the distributed system includes a plurality of security modules, which may be, for example, hardware security modules (HSMs) or other cryptographic devices that securely store and use cryptographic material, such as described in more detail below. The security modules may operate services whereby the security modules are operable to perform cryptographic operations on request, where requests to the security modules may identify (e.g., provide) data and specify the cryptographic operation(s) to perform and, in some embodiments, parameters for the cryptographic operations to perform, such as a mode of a cryptographic algorithm to utilize. Multiple security modules may share the same cryptographic information for the purpose of availability, durability and scalability.

The distributed system may also include devices that consume services provided by the security modules. These devices, which may be referred to as consumer devices, may generate and transmit requests to the security modules, thereby causing the security modules to fulfill the requests. As an example, a consumer device may generate and transmit a request to encrypt plaintext provided in the request using a cryptographic key identified in the request (or otherwise determinable by the security module). The plaintext may be another cryptographic key utilized by the consumer device to perform its own operations, although other data is included within the scope of the present disclosure. Similarly, a consumer device may generate and transmit a request to a security module to decrypt ciphertext (e.g., an encrypted plaintext, which may be an encrypted cryptographic key) using a cryptographic key identified in the request (or otherwise determinable by the security module). Generally, the consumer devices may submit requests to the security modules to perform cryptographic operations using cryptographic material securely stored within the cryptographic modules.

The distributed system may also include other nodes that have other roles. For example, in some embodiments, the distributed system has a plurality of operator devices (referred to simply as "operators"), which may be devices operated by human or other administrators of the distributed system. The operators may be responsible for administrative maintenance of the distributed system, such as making updates and other changes to the system. In various embodiments, as discussed in more detail below, many actions performable by the operators require compliance with a set of quorum rules. Another component of a distributed system may include a coordinator module, which may be a device responsible for automated administration of various management tasks with the distributed system, such as cryptographic key rotation among the security modules and orchestrating updates to the distributed system in accordance with rules and requirements for such updates.

In various embodiments, strict security protocols are followed to ensure the security of data handled by the distributed system. For example, cryptographic material (e.g., cryptographic keys or information used to derive cryptographic keys) is required to be rotated (i.e., old cryptographic material is retired and replaced with new cryptographic material) with sufficient frequency to avoid enablement of cryptographic attacks that utilize large enough numbers of ciphertexts to determine cryptographic keys. As another example, components of the distributed system are configured to operate with a consistent set of parameters about the system to prevent security breaches. For instance, a cryptographic domain (simply referred to as a "domain") may be defined by a set of cryptographic keys, a set of security modules authorized to participate in the cryptographic domain (e.g., by performing cryptographic operations using the set of cryptographic keys), a set of operators and a set of quorum rules defining conditions for the operators to be able to modify the cryptographic domain and possibly other information in various embodiments. Each security module of a cryptographic domain may be configured with a currently installed domain such that, for example, the security modules cryptographically verify compliance with the quorum rules of the currently installed domain before installing a new domain. In this manner, the likelihood of an isolated security breach causing a significant effect on the security of data is greatly reduced. As an illustrative example, unauthorized access to an operator device would not, by itself, provide the ability to update a cryptographic domain when quorum rules require authorization by multiple operators. Possible modifications to a cryptographic domain include, but are not limited to, additions and/or subtractions of members of the cryptographic domain, additions and/or subtractions of operators from the cryptographic domain and/or additions and/or subtractions of quorum rules of the cryptographic domain. Possible modifications also include modifications to existing elements (e.g., members, operators and/or quorum rules), such as modifications that replace a public key of an operator or member with another public key for the operator.

In various embodiments, operational components of the distributed system (e.g., operators, security modules and consumers devices) are configured to perform certain operations only upon validation of certain information. As an example, as noted, a security module may require cryptographic proof that a new version of a domain for installation has been authorized in accordance with a set of quorum rules effective for the current domain (where "current" is from the perspective of the security module since, as noted, another security module may, at a given time, have another version of the domain installed). As another example, a consumer of a service operated by a security module that sends a request to the security module may not rely on a response from the security module unless a level of trust has been established for the security module, which may include cryptographic confirmation that the security module operates in accordance with a valid version of a cryptographic domain. In some embodiments, a domain is partially defined by a domain trust, which may be a structured collection of information that specifies the operators, members (e.g., security modules) and quorum rules for a domain. Each version of a domain trust may also specify a number or other identifier for the version.

In an embodiment, an operational component of the distributed system is configured with the ability to update from one version of a domain to a later version of the domain, where the later version of the domain is not the immediately subsequent version of the domain (e.g., if the current version of the domain is version N, versions are sequenced by increasing integer values, and the later version is greater than N+1). To do this in a secure manner, an operational component may perform one or more operations to verify authenticity of the later version domain trust. In some embodiments, for some or all operational components of the distributed system, it is sufficient to verify that a digital signature of the later version domain trust was generated using a private cryptographic key corresponding to a member (e.g., security module) identified as a member of the current domain trust. If such a digital signature is not present, for example, because the domain trust was digitally signed by a member of the later version domain trust that is not present in the current domain trust, verification of the later version domain trust may nevertheless be successful. For instance, in some embodiments, the operational component is configured to use the current version of the domain trust to verify the immediately next version of the domain trust, use the latest verified version of the domain trust to verify the immediately next version (relative to the latest verified version), and so on.

In some embodiments, each verified version can be used to verify the immediately next version until one or more criteria for accepting the purported latest version are satisfied. In some embodiments, later versions may be sequentially verified until a version is verified that identifies the member of the domain that digitally signed the purported latest version of the domain trust (and the digital signature of the domain trust is valid). In other embodiments, subsequent versions of the domain trust are sequentially verified until the version immediately preceding the purported latest version is both verified by an earlier version and used to verify the purported latest version. The one or more criteria may be context dependent. For example, whether versions of the domain trust need to be verified all the way to the purported latest version may depend on a number of versions between the current version and the purported latest version so that, for instance, smaller jumps between versions are allowable but larger jumps require verification all the way from the current version to the purported latest version. Other variations are also considered as being within the scope of the present disclosure.

When a later version of a domain trust is verified by an operational component of the distributed system, the operational component may operate in accordance with the later version. For example, a caller to a security module may accept responses generated by security modules identified in the later version. An operational component may also use the later version of the domain trust to verify whether to install another subsequent version of the domain trust (and/or the domain). Generally, the operational component may operate in accordance with the parameters set by the verified later version of the domain trust.

In various embodiments, the ability to update to one version of a domain (or domain trust) to another requires a secure initial setup so that, for example, a version of a domain trust is reliably usable to update to a subsequent version of a domain trust. In other words, techniques of the present disclosure provide for secure generation of a starting point, which can be used to build a chain of trust where each domain trust in the chain is usable to securely update to one or more later versions. In an embodiment, an initial trust is generated. The initial trust may be a structured collection of data that defines at least a set of operators, a set of quorum rules and information usable to cryptographically verify authorization by an operator (e.g., a public key of a public-private key pair corresponding to each operator in the defined set of operators). The initial trust may be cryptographically signed or otherwise verifiable (e.g., encrypted) using cryptographic material associated with a root of trust (e.g., cryptographic key) that both (1) operators in the set of operators and (2) at least one security module are configured to trust. In other words, operators (e.g., operator computing devices) and security modules are configured to operate in accordance with whether information rendered cryptographically verifiable (e.g., digitally signed) using cryptographic material associated with the root of trust is successfully verified, such as described in more detail below.

As noted, the initial trust may be digitally signed using a cryptographic key associated with the root of trust, such as a private key of a public-private key pair. An entity with access to the root of trust may select or otherwise specify the operator(s) and quorum rule(s) and any other information for the initial domain trust, serialize the information for the initial domain trust to a canonical representation and use the serialized information to generate the initial domain trust. Various security measures may be taken to ensure security of the initial domain trust. For instance, the digital signature may be generated in a secure environment (e.g., on a computer system disconnected from a public network) in accordance with an application that has been cryptographically verified (e.g., through remote attestation) as in a valid state.

In various embodiments, once the initial domain trust has been created and digitally signed, an operator may verify the digital signature of the initial domain trust and, on a condition that the digitally signature is verified, instruct a security module to install the initial domain trust. Instruction to install the initial domain trust may involve transmitting a command to a selected security module. In some embodiments, such a command is required (by the code executed by the security module) to be authorized in accordance with the quorum rule(s) of the initial domain trust although, in other embodiments, the command does not require compliance with the compliance rules. The security module that receives the command may verify the digital signature of the initial domain trust and, contingent on successful verification of the digital signature, install the initial domain trust. The security module, in response to a command to install (ingest) the initial domain trust or in response to another command, generates a remote attestation as to its state and provide the remote attestation. The remote attestation (also referred to as simply an "attestation") may be generated, for instance, by a trusted platform module ("TPM") or other cryptographic module of the security module and may serve as cryptographic proof as to a state of software installed on the security module. Generally, the attestation may chain to a root of trust a system verifying the remote attestation is configured to trust. In other words, the attestation may be cryptographically verified using cryptographic material associated with the root of trust or other cryptographic material that is directly or indirectly verifiable using the cryptographic material associated with the root of trust.

One or more operators may be configured to trust (operate in accordance with verification by) a root of trust (e.g., a TPM) of the security module and also with information indicating one or more valid states of security module software. Once the security module has installed the initial domain trust, an operator (which may be the same operator that caused the initial domain trust to be installed) may verify the attestation of the security module and, contingent on successful verification of the security module, issue a quorum-authorized command to the security module to create the domain. The operator, as part of this process, may obtain authorization for the command from a quorum-satisfying set of operators, which may include the operator obtaining the authorization from the other(s). Further, obtaining authorization from a quorum of operators may include accessing from data storage information that is cryptographically verifiable as having pre-authorized by the quorum, such as a set of digital signatures that was stored for later access. As noted, other variations include those where another application obtains a quorum-satisfying set of authorizations and, after such has been obtained, an operator may cause a command to be issued.

The security module may receive the quorum-authorized command to create the domain. The quorum-authorized command may include cryptographically verifiable proof that the command has been authorized by a set of operators that satisfies the quorum rule(s) of the initial domain trust. The cryptographic proof may be a set of digital signatures, each generated by a respective operator in the set of operators. Cryptographic proof may, however, be indirect, such as when the command is issued by an application (i.e., by a computer system executing the application) configured to enforce the quorum rule(s). A quorum-satisfying set of operators may log into the application and each individually authorize the command. A digital signature of the application may serve as cryptographic proof that the quorum rule(s) are satisfied. Remote attestation may be used to enable the security module to verify that the application was in an approved state (and, therefore, the application was configured to enforce the quorum rule(s)). Other variations are also considered as being within the scope of the present disclosure.

Contingent on successful verification of authorization by a quorum of operators of the command to create the domain, the security module may create a first domain trust and a domain token for the domain. The first domain trust may specify a set of security modules (which may include the security module fulfilling the command to create the domain), a set of operators (which may be the same set as in the initial domain trust) and other information, such as described below. The security module may digitally sign the domain token and domain trust and provide the domain token and domain trust to be used, such as described above and below and in U.S. patent application Ser. No. 14/284, 278, filed on May 21, 2014, entitled "WEB OF TRUST MANAGEMENT IN A DISTRIBUTED SYSTEM," which is incorporated herein by reference. The domain token and domain trust may then be used to update the domain.

FIG. 1 shows an illustrative example of a diagram 100 illustrating various aspects of the present disclosure. In an embodiment, one or more roots of trust 102 are trusted by one or more operators 104 and one or more security modules 106. In other words, the security module 106 and a device associated with an operator 104 are each configured to operate in accordance with whether certain information, as discussed in more detail below, is validated using cryptographic material associated with (e.g., accessible to) a root of trust 102. Thus, the operator's device (referred to simply as an "operator" when clear from context) and security module 106 process information differently depending on whether the information has been rendered cryptographically verifiable (e.g., digitally signed) by a root of trust 102. As an example, if a digital signature purportedly generated by the root of trust 102 fails to be cryptographically verified using a cryptographic key associated with the root of trust 102 (e.g., a public key corresponding to a private key purportedly used by the root of trust to digitally sign), an operator 104 and/or security module 106 may reject the information purportedly used to generate the digital signature.

Turning to specific examples, as illustrated in FIG. 1, a root of trust may be a computer system with access to one or more cryptographic keys where the cryptographic keys are such that, digital signatures and/or other information (e.g., ciphertext) generated using the cryptographic keys can be verified as having been generated by the root of trust. For example, the operator 104 and security module 106 may be provisioned with a digital certificate (also referred to as a "public key certificate") that encodes a public cryptographic key to which the root of trust has access. The digital certificate may be configured to bind an identity of the root of trust to the public key. The digital certificate may be digitally signed by a certificate authority. The operator 104 and security module 106 may be configured (e.g., with executable code) to operate in accordance with whether digital signatures are verifiable using the public key (i.e., because the digital signatures were generated using the corresponding private key).

A cryptographic key held privately by the root of trust (e.g., a private key of a public-private key pair or a symmetric key shared with the operator 104 and/or security module 106) may be used to issue an initial domain trust. As discussed in more detail below, an initial domain trust 108 (also referred to as an "initial domain trust") may be a set of information that defines, at least in part, a set of conditions by which a first domain trust may be issued, where a domain trust may be a set of information defining the participants in a cryptographic domain and rules for changing the cryptographic domain, such as described in more detail below. As illustrated in FIG. 1, the root of trust may issue the initial version of the domain trust by rendering the initial version of the domain trust cryptographically verifiable as authorized by the root of trust. For example, the root of trust may use a cryptographic key to digitally sign the initial version of the root of trust one or more times such that the operator 104 and security module 106 are each able to cryptographically verify that the root of trust authorized the initial version of the domain trust. While digital signatures are used throughout the present disclosure for the purpose of illustration, other types of authentication information that provide for cryptographic verifiability are considered as being within the scope of the present disclosure. For instance, a domain trust (or other information) may be cryptographically verifiable by being encrypted such that, the ability to use a cryptographic key associated with a root of trust to decrypt the domain trust serves to indicate authorization by the root of trust.

In various embodiments, the initial version of the domain trust 108 being cryptographically verifiable as authorized by the root of trust 102 enables the initial version of the domain trust 108 to be used to issue a first domain trust 110 (first version of the domain trust), which is a domain trust, such as described in more detail below in connection with FIG. 6. In particular, the operator 104 may be configured (e.g., with executable code) such that cryptographic verification of the initial version of the domain trust as authorized by the root of trust is a requirement for commanding a security module 106 to issue the first domain trust 110. Similarly, the security module 106 may be configured such that cryptographic verification of the initial version of the domain trust as authorized by the root of trust is a requirement for issuing the first domain trust 110. As another example, consumers of services provided by the security modules of the cryptographic domain may only accept results of cryptographic operations that are cryptographically verifiable as from a security module in the current version of the domain trust. Additional requirements and other variations, some of which are discussed in more detail below, are also considered as being within the scope of the present disclosure. It should be noted that the first domain trust 110 may be rooted in a root of trust different than the root of trust 102 since the first domain trust 110 may be digitally signed using a key private to the security module 106 that digitally signed the first domain trust 110. Because of procedures in place to obtain the first domain trust using the initial version of the domain trust 108, assurances are present that the first domain trust was generated in a secure manner.

Figure 2:
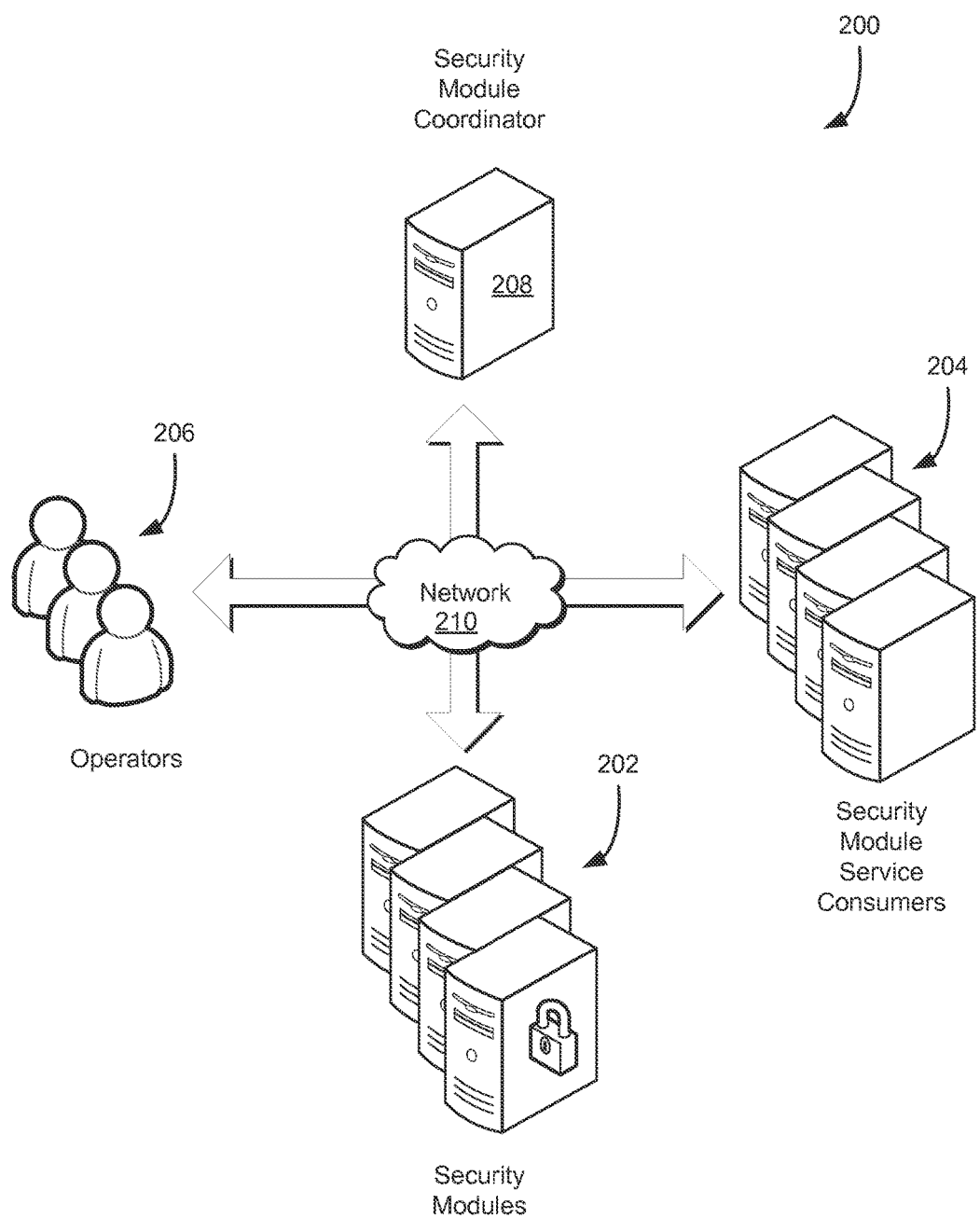
FIG. 2 shows an illustrative example of an environment in which various embodiments can be implemented.

In accordance with various embodiments, once the first domain trust 110 has been issued, the first domain trust 110 may be used to issue subsequent versions 112 of the domain trust. For example, as discussed further below, security modules of a cryptographic domain (as specified in a current version of the domain trust) may each be configured such that issuance of a new version of the domain trust requires conditions specified by the current domain trust version to be satisfied (e.g., that quorum rules of the current version of the domain trust are satisfied). Examples of techniques for updating a domain trust and verifying new versions of a domain trust are discussed in more detail below FIG. 2 shows an illustrative example of an environment 200 in which various embodiments may be practiced. The environment 200 may be, for example, a distributed system, such as described above. The distributed system may form a cryptography service, such as described in more detail below in connection with FIG. 9. In an embodiment, the environment 200 includes various nodes such as security modules 202, security modules service consumers 204 and operators 206, such as described above. While the operators 206 are illustrated with human forms in FIG. 2 as discussed, the operators communicate in the environment 200 with associated computing devices referred to as "operator computing devices" and simply as "operators." In other words, the term "operator" is intended to refer to a computer system, which may operate pursuant to input of a human operator and/or an automated process. In some embodiments, an operator is associated with a human operator, at least in some points in time, such as when an operator has used credentials to log into a device, although such associations may not be permanent.

The environment 200 may also include a security module coordinator 208 (also referred to as a "coordinator module"), which may be a computer system configured to orchestrate administrative processes for the environment 200. For example, the security module coordinator 208 may be configured with executable code that causes the security module coordinator 208 to coordinate cryptographic key rotation among the security modules 202. The security module coordinator 208 may also perform other administrative operations, such as scheduling and orchestrating the update of cryptographic domains and/or domain trusts. Example operations and manners for performing operations are described in U.S. patent application Ser. No. 13/916,915, filed Jun. 13, 2013 and titled "Device Coordination," which is incorporated herein by reference. Other operations, including operations performed in connection with establishing and maintaining secure sessions, are described in U.S. patent application Ser. No. 13/916,964, filed Jun. 13, 2013 and titled "Session Negotiations," which is incorporated herein by reference. In some embodiments, for example, a group of operators 206 may authorize and update to a domain and/or domain trust. The information being updated may be digitally signed by a quorum of the operators 206 (i.e., by one or more individual operators who collectively (or individually, if only one) form a quorum), where a quorum is defined in accordance with a set of quorum rules of a cryptographic domain installed on a set of the security modules 202, which may be the security modules identified in the current domain.

An operator may provide the authorized update to the security module coordinator 208, which may perform one or more work flows to ensure that the update is installed on an appropriate set of security modules, such as a set of security modules identified in the update, if the update is to a cryptographic domain. In this manner, the operators 206 need only be concerned with obtaining proper authorization and the security module coordinator 208 handles the propagation of updates throughout the environment 200 as appropriate and according to particular updates being made. As discussed above, cryptographic domains may define various parameters in which a distributed system may operate. A cryptographic domain may be defined by a domain token.

Figure 3:
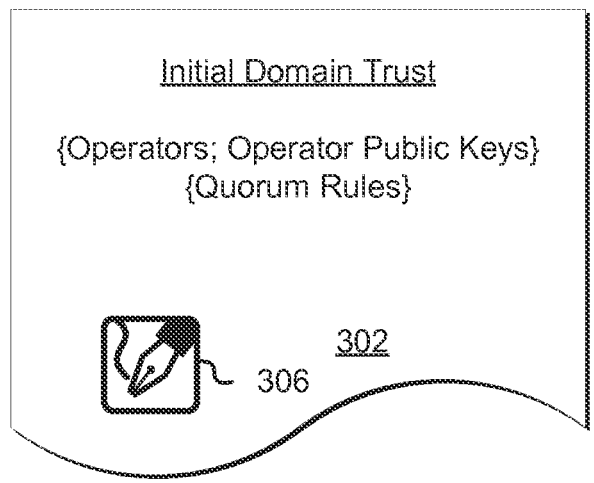
FIG. 3 shows an illustrative example of an initial domain trust in accordance with at least one embodiment.

FIG. 3 shows an illustrative example of an initial domain trust, in accordance with at least one embodiment. As illustrated in FIG. 3, an initial domain trust 302 includes a collection of information necessary and/or sufficient for issuing a first version of a domain trust. In an embodiment, the information is arranged in a structured format, such as in accordance with eXtensible Markup Language (XML), JavaScript Object Notation (JSON) or other formats. In the example illustrated in FIG. 3, the domain trust specifies a set of operators and respective public keys, where each operator specified in the initial domain trust has a corresponding private key corresponding to a respective public key. The public keys may be directly encoded in or otherwise referenced by the initial domain trust 302 in various ways in accordance with various embodiments. For example, the public keys may be encoded in fields of the initial domain trust 302. As another example, digital certificates may be included in or otherwise referenced by the initial domain trust 302.

The initial domain trust 302 may also include information specifying one or more quorum rules for issuing a domain trust from the initial domain trust 302. The quorum rules may specify conditions on a set of operators being authorized to issue a command to create a domain trust, such as described in more detail below. For example, the conditions may specify a minimum number of operators required to issue a command to a security module to create a domain. Conditions may also be more complex. For instance, operators may also have roles which may be associated with the operators (i.e., with identifiers of the operators) in the initial domain trust 302. Conditions of the quorum rules may specify conditions on roles, such as a minimum number of operators having a particular role being required. Conditions may also be structured such that there may be different ways of satisfying the quorum rules. As an illustrative example, quorum rules may be satisfied if a first number of operators having a first role authorize a command to create a domain or if a second number of operators having a second role authorize the command. Individual conditions may be combined with Boolean operators, such as AND, OR, NOT and AND NOT. Other information may also be associated with individual operators and quorum rules may have conditions based at least in part on that other information.

As illustrated in FIG. 3, the initial domain trust may have a digital signature 306. It should be noted that initial domain trusts, and domain trusts in general, may have different states. For example, a domain trust may have an unvalidated state without the digital signature 306 and a validated state with the digital signature 306. The digital signature 306 may be generated by a root of trust, such as described above. For example, a private key of a public-private key pair may be used to generate the digital signature 306. It should be noted that a digital signature of a domain trust (e.g., initial version of a domain trust) can be considered to be part of the initial domain trust or a separate piece of data. Generally, an operation of transmitting or receiving (or performing other operations) a digital signature of a domain trust, unless otherwise specified, indicates that the digital signature may be encoded in the domain trust or encoded separately from the domain trust. Thus, a computer system that receives a domain trust and a digital signature of the domain trust, unless otherwise specified, may receive two separate pieces of information or a single piece of information that includes both.

Presence of the digital signature, and that digital signature being valid, serves to indicate to a system configured with a public key corresponding to the private key (or, in alternate embodiments, a symmetric cryptographic key) used to generate the digital signature that the corresponding domain trust was authorized by a root of trust that the verifying system is configured to trust. Thus, an operator can verify the digital signature 306 to determine whether to instruct a security module to install the domain trust 302 and, when instructed to install the domain trust 302, the security module can verify the digital signature 306 as a condition for fulfilling the instruction.

As noted, the initial domain trust 302 may include information in addition to that illustrated in FIG. 3. For example, in some embodiments, the initial domain trust 302 specifies a set of security modules authorized to use the initial domain trust 302 to issue a new domain trust. Also, as noted, one or more roles may be associated with one or more operators identified in the initial domain trust 302. Other information may also be included in accordance with various embodiments and such information may be used to determine how and/or whether to perform certain operations, such as issuing a new domain trust.

Figure 4:
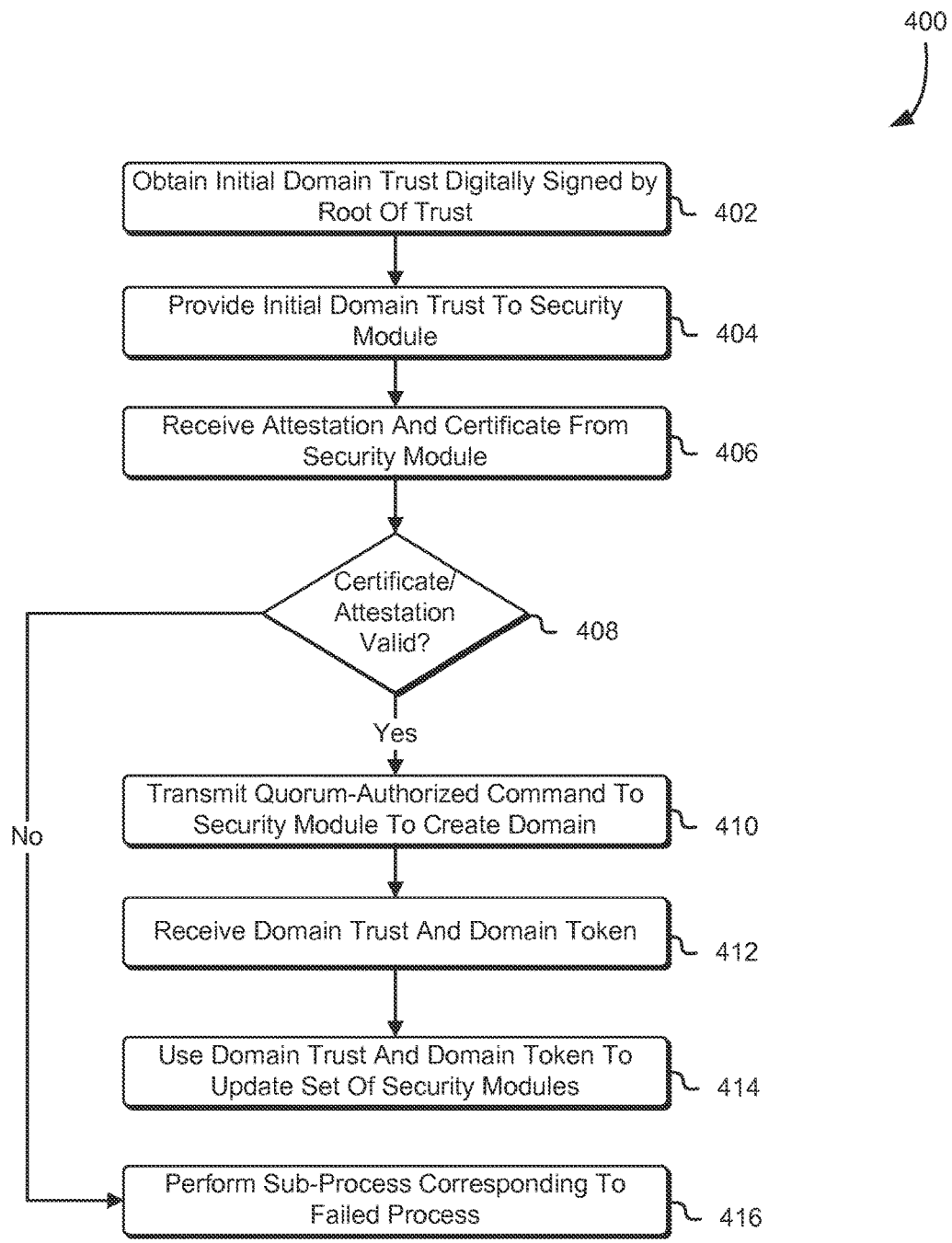
FIG. 4 shows an illustrative example of a process for updating a set of security modules in accordance with at least one embodiment.

FIG. 4 shows an illustrative example of a process 400 for updating a set of security modules in accordance with one embodiment. The process 400 may be performed by any suitable system, such as an operator computing device, which may be a computing device having one or more applications to which one or more operators are logged in (i.e., that are in a state corresponding to one or more operators having provided sufficient security credentials to authenticate). In an embodiment, the process 400 includes obtaining 402 an initial domain trust digitally signed by a root of trust to the system performing the process 400. The root of trust may be a system different from the system performing the process 400 although, in some embodiments, the root of trust is the same as the system performing the process 400. The initial domain trust may be received in various ways in accordance with various embodiments, such as in a communication over a network or from computer memory (e.g., encoded on a Universal Serial Bus (USB) drive, secure digital (SD) card or otherwise) provided to the system performing the process 400.

Once the initial domain trust has been received 402, the process 400 may include providing 404 the initial domain trust to a security module. The initial domain trust may be provided 404 in various ways, such as by transmitting the initial domain trust over a network, which may be a local area network isolated from a public network, in some embodiments, to the security module, although other ways of providing the initial domain trust are considered as being within the scope of the present disclosure. The security module may be configured to provide an attestation and digital certificate and, accordingly, the process 400 may include receiving 406 an attestation and digital certificate from the security module. The attestation and digital certificate may be received in accordance with a manner by which the initial domain trust was provided (e.g., over a network). Further, the certificate and attestation may be provided in response to the initial domain trust having been provided or otherwise, such as in a separate request (not illustrated) sent to the security module by the system performing the process 400. The attestation and digital certificate may be information that is collectively sufficient to cryptographically verify a state of the security module (e.g., the state of firmware, operating system code and/or application code). In some embodiments, the attestation is generated by a TPM or other cryptographic module of the security module and the certificate may therefore be issued by a corresponding certificate authority. Further, an attestation may be generated based at least in part on code loaded into execution space, before a first instruction of the code has been executed.

Accordingly, the process 400 may include verifying the digital certificate (e.g., by verifying a digital signature of the certificate generated purportedly by the certificate authority) and the attestation, using a public key encoded in or otherwise referenced by the certificate. Verification of digital signatures in performance of the process 400 may proceed in accordance with one or more cryptographic algorithms by which the digital signatures were generated (e.g., by using an appropriate cryptographic key to generate reference information that indicates whether the digital signature is valid). If it is determined 408 that the certificate and attestation are both valid, the process 400 may include transmitting 410 a quorum-authorized command to the security module (or to another security module that has installed the initial domain trust) to create a domain. The command may be transmitted, such as described above. It should be noted that a successful verification of validity of the attestation, in some embodiments, serves as an indication of validity of the initial version of the domain trust being authorized by the root of trust. In particular, executable code utilized by the security module may cause the security module to verify that the initial version of the domain trust was authorized by the root of trust. Consequently, a cryptographically verifiable attestation that the code is in an authorized state generated based at least in part on that code serves to indicate that the security module has performed the requisite verification of authorization of the initial version of the domain trust by the root of trust.

To generate the quorum-authorized command, the process 400 may include additional operations, such as obtaining digital signatures from operators to form a set of digital signatures that serves to cryptographically prove that a quorum of operators has authorized the command. Also, as noted, the process 400 may be performed by a computer system into which a quorum-satisfying set of operators is logged in. The system may digitally sign the command and the digital signature may serve as an attestation that a quorum has authorized the command. An attestation to executable code by the system may be provided to the security module to enable the security module to verify the attestation to verify that the computer system is in a valid state and, therefore, that the command would not have been issued unless a quorum of operators had authorized issuance of the command.

Returning to the embodiment illustrated in FIG. 4, the process 400 may include receiving 412 a domain trust (i.e., a new version of a domain trust) and a domain token from the security module that fulfilled the quorum-authorized command. The received 412 domain trust may be used 414 to update a set of security modules. Using 414 the domain trust to update the set of security modules may be performed in various ways in accordance with various embodiments. For example, a security module may, in the same or in separate communications, provide each security module of a set of security modules the initial version of the domain trust the received 412 domain trust, and a domain token (which may be received with the domain trust) in connection with a command to ingest (install). A security module that receives the domain trust, initial domain trust, and domain token may use the initial domain trust to determine whether to update to the domain trust and utilize information in the domain token. The security module may hake various determinations, such as described below. The security module, for example, may cryptographically verify that the initial domain trust was issued by a root of trust. The security module may also verify that the domain trust was authorized by a quorum of operators, where the quorum is defined by the initial domain trust. To receive the domain trust and/or domain token, the security module may obtain an attestation (e.g., generated by a TPM of the security module) and successful verification of the attestation may be a condition precedent for an operator device or other device for providing the domain trust and/or domain token. Upon fulfillment of all requirements, the security module may operate in accordance with the domain trust and domain token, such as described below. It should be noted that the same operator may update all of the security modules in the set of security modules or, in some embodiments, different operators may update different security modules. Generally, any particular update to a security module may be made in accordance with the requirements associated with the initial domain trust.

If, however, it is determined that the attestation and/or certificate 408 is invalid, the process 400 may include performing 406 a sub-process corresponding to the process 400 having failed. For example, the system performing the process 400 may simply not generate and/or issue a new domain, may provide a notification of the failure, may provide one or more reasons for the failure and, generally, perform one or more operations corresponding to the certificate and/or attestation failing.

As with all processes described herein, numerous variations are considered as being within the scope of the present disclosure. For example, while not illustrated in FIG. 4, a system performing the process 400 may verify a digital signature of the initial domain trust that was obtained 402 and performance of subsequent operations may depend on whether the digital signature is valid. As another example, the domain trust and domain token may be cryptographically verified by the system performing the process 400 as a condition for performance of subsequent operations. As yet another example, the quorum-authorized command may be digitally signed by the system performing the process 400. Further, some operations may be performed asynchronously (i.e., not part of the same programmatic workflow). Generally, other variations are also considered as being within the scope of the present disclosure. Further, in some embodiments, security modules are configured to update other security modules identified in an installed domain trust, such as in accordance with a consensus or other protocol. In some embodiments, the attestation and the quorum-authorized command are provided to the security module and the security module is configured to successfully verify both the attestation and authorization by a quorum before creating the domain and/or performing other operations. In variations of such embodiments, the system performing the process 400 may or may not separately verify the attestation.

Figure 5:
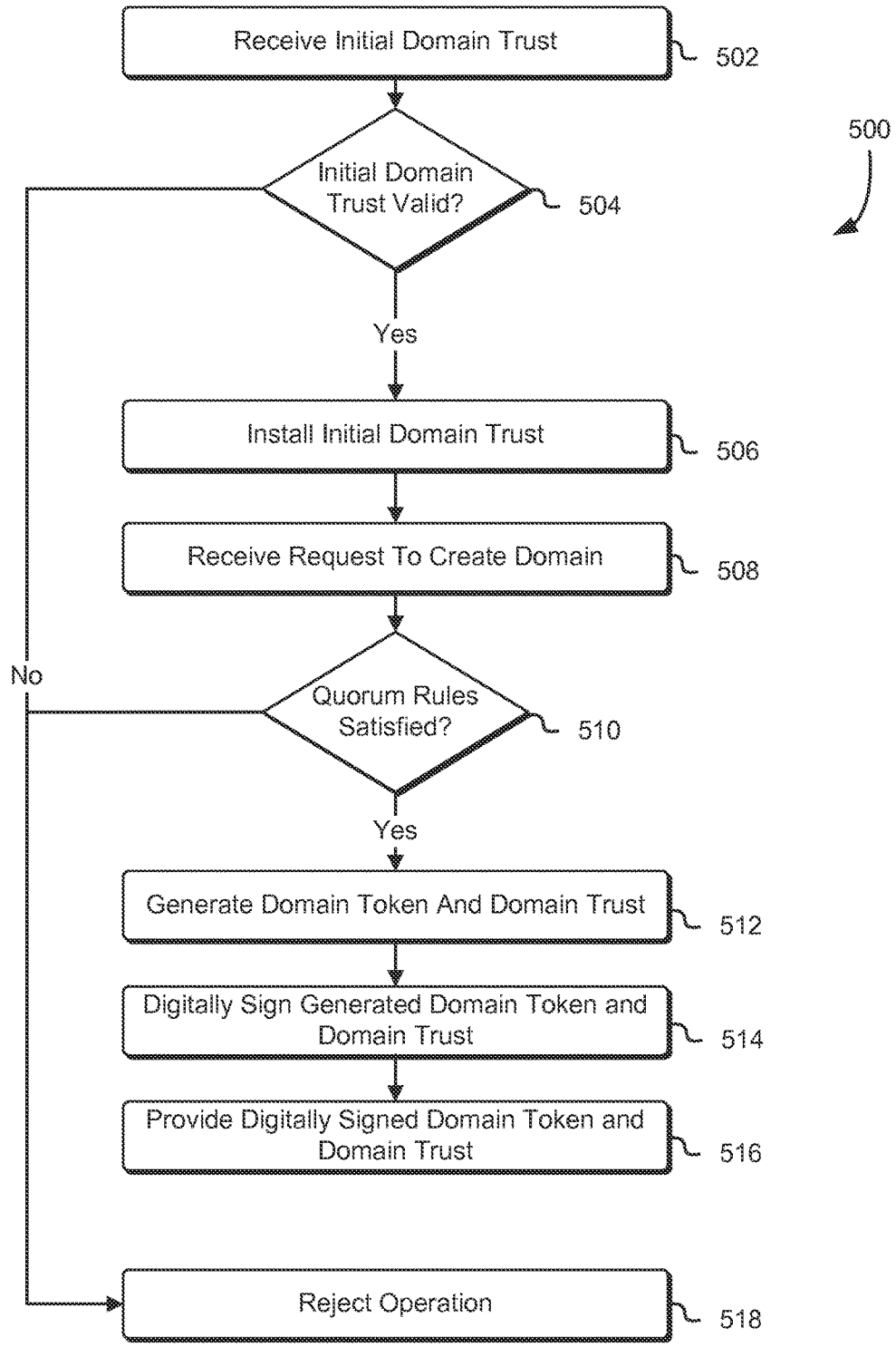
FIG. 5 shows an illustrative example of a process for creating a cryptographic domain in accordance with at least one embodiment.

FIG. 5 shows an illustrative example of a process for issuing a domain trust in accordance with at least one embodiment. The process 500 may be performed by any suitable system, such as by a security module in the environment discussed above in connection with FIG. 2 or, generally, any system configured with authority (e.g., by way of access to one or more particular cryptographic keys). In an embodiment, the process 500 includes receiving 502 an initial domain trust, such as from a system performing the process 400 discussed above in connection with FIG. 4. A determination may be made 504 whether the initial domain trust is valid. As noted, a system performing the process 500 may be configured to operate to trust a root of trust and, accordingly, determining 504 whether the initial domain trust is valid may include verifying a digital signature of the initial domain trust using a cryptographic key (e.g., public key of a public-private key pair) associated with the root of trust, where the cryptographic key, in some embodiments, is available from a digital certificate issued by a trusted certificate authority where the digital certificate binds an identity of the root of trust to the public cryptographic key corresponding to a private cryptographic key accessible to the root of trust.

If it is determined 504 that the initial domain trust is valid, the process 500 may include installing 506 the initial domain trust, which may include storing the initial domain trust and configuring one or more settings such that the system performing the process 500 becomes configured to utilize the initial domain trust. Synchronously or asynchronously with the above operations, the process 500 may include receiving 508 a request (command) to create a domain. The request may be received in a manner by which the request was submitted (e.g., over a network). Further, the request may be received from an operator that provided the initial domain trust or another operator or another system operating under authority of an operator. Upon receiving 508 the request to create a domain, the process 500 may include determining 510 whether the set of quorum rules specified by the received 502 initial domain trust are satisfied. The determination 510 whether the set of quorum rules specified by the received 502 initial domain trust are satisfied may be made based at least in part on a set of digital signatures of the request to create the domain. For example, the set of digital signatures may be digital signatures generated by respective operators. As another example, the set of digital signatures may comprise a digital signature generated by a computer system configured to enforce quorum rules. In the latter embodiment, an attestation of the computer system to ensure that code causing enforcement of the quorum rules is in a valid state may also be cryptographically verified as a condition for creating a domain.

If determined 510 that the set of quorum rules are satisfied, the process 500 may include fulfilling the request by generating 512 a domain token and a domain trust, such as described in more detail below. The generated domain token and domain trust may be issued by separately digitally signing 514 the domain token and domain trust and providing 516 the digitally signed domain token and domain trust. The domain token and domain trust may also be installed on the system performing the process 500.

If determination 504 of validity of the domain trust fails and/or if determination of satisfaction of the set of quorum rules fails, the process may include rejecting a respective operation, as appropriate, such as by not installing the unverified initial domain trust and/or not generating a domain token and domain trust. Other operations, such as by providing a reason for the rejection, may also be performed.

Numerous variations of the above are considered as being within the scope of the present disclosure. For example, providing an initial domain trust may comprise first generating an initial domain trust digitally signed by a root of trust and then generating an initialization token using the digitally signed initial domain trust. The initialization token may be generated with an identifier of a security module and a nonce. The identifier, upon successful processing of the initialization token, may assume the included identifier. The initialization token may be digitally signed by the same or a different root of trust. The identified security module(s) may be configured to process the initialization token accordingly to install the initial domain trust, such as by verifying a digital signature of the token and verifying a digital signature of the initial domain trust, which may be generated with the same cryptographic key or using different cryptographic keys. Further, as part of installation of an initial domain token, a security module may generate or otherwise obtain one or more cryptographic key pairs and provide public keys of the key pairs to enable use of the public keys for various purposes, such as for digital signature generation and/or cryptographic agreement, such as by way of the elliptic curve Diffie-Hellman key agreement algorithm. In some embodiments, a security module may use a cryptographic key (identity key) to negotiate a session key that the security module then uses to encrypt the current set of domain kays. When the security module shares its state with another security module, the security module may encrypt the domain keys with a randomly generated key, encrypt that key with a key established using an ephemeral Diffie-Hellman key and the other security module's identity key.

As discussed above, cryptographic domains may define various parameters in which a distributed system may operate. A cryptographic domain may be defined by a domain token. FIG. 6, accordingly, shows an illustrative example of a domain token 600 in accordance with various embodiments. In an embodiment, the domain token 600 includes various types of information useful to a distributed system for the performance of cryptographic operations, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Returning to FIG. 6, the domain token includes one or more domain token fingerprints. A domain token fingerprint may be a hash of a previous domain token version. In an embodiment, a domain token 600 includes a hash for each previous version of the domain token 600. Although in other embodiments, the number of domain token fingerprints may be limited. In an embodiment, the domain token 600 also includes a set of encrypted domain keys. A domain key may be a key usable for cryptographic operations in accordance with a cryptographic domain defined by the domain token 600. In an embodiment, the domain token 600 includes an encrypted domain key for a current domain token as well as encrypted domain keys for one or more prior versions of the domain token 600, which may be some or all of the previous versions of the domain token 600. In an embodiment, the domain keys are encrypted so as to be decryptable by security modules identified in the domain token 600. The manner in which the domain keys are encrypted may vary in accordance with various embodiments and generally, domain keys may be encrypted in any suitable manner such that security modules can decrypt and utilize the encrypted domain keys. In some embodiments, a current domain key is encrypted multiple times, each time using a different public key of a different security module of the domain defined by the domain token 600. (As discussed below, the domain token 600 may include such public keys, although they may be accessed from outside of the domain token.) In some embodiments, prior version domain keys are encrypted under the current domain key. In this manner a security module may utilize a private key corresponding to the public key that was used to encrypt the current domain key to decrypt the current domain key and, if necessary, utilize the current domain key to encrypt one or more prior versions of the encrypted domain key. Other ways of encrypting the domain keys are also considered as being within the scope of the present disclosure. For example, one or more domain keys, whether current or prior, may be encrypted using a secret (e.g., cryptographic key) shared among the security modules, which may be a prior version of the domain key or another shared secret. (If a new security module is added to the domain, a Diffie-Hellman key exchange or other secure transfer may be used to enable the added security module to obtain the cryptographic key for decrypting the new domain key from another security module.) Generally, any way by which encrypted domain keys are encrypted so as to be decryptable by security modules are considered as being within the scope of the present disclosure.

Figure 6:
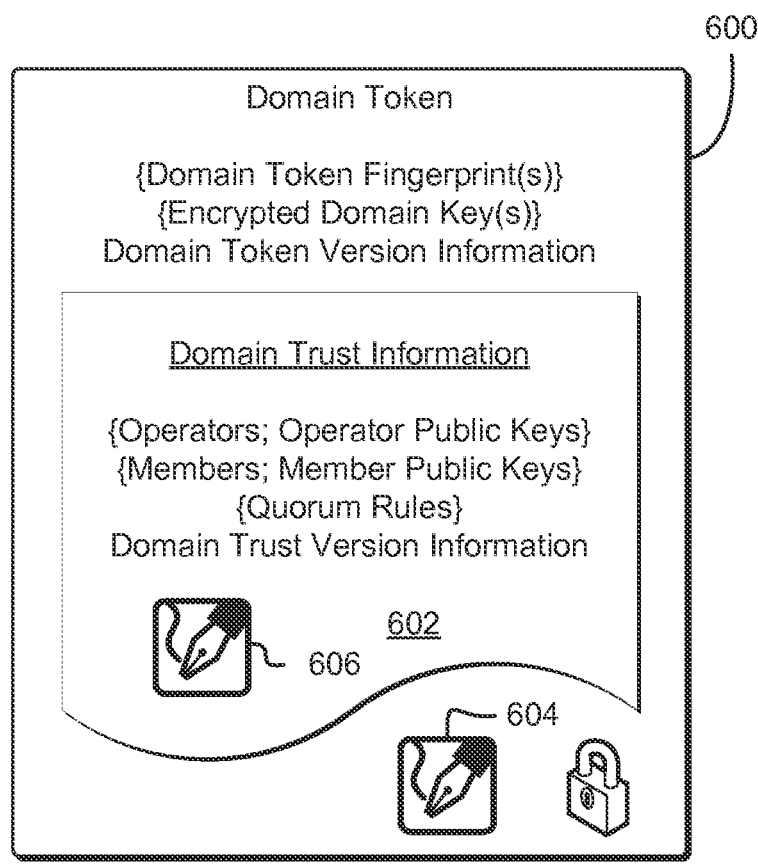
FIG. 6 shows an illustrative example of a domain token in accordance with at least one embodiment.

As illustrated in FIG. 6, the domain token 600 may also include domain token version information which may be information identifying a version of the domain token 600. The domain token 600 may be identified using versions that correspond to positive integers such as described above in connection with domain trusts. In an embodiment, the domain token 600 also includes a domain trust 602. The domain trust 602 may include information defining operational components of the domain defined by the domain token 600, rules by which the domain trust can be changed, and version information such as described above. In this particular example, the domain trust 602 identifies a set of operators in association with operator public keys. Each operator, for example, may be assigned a public/private key pair where the operators securely maintain the private key of the key pair. The domain trust 602 also identifies a set of members in association with the set of member public keys. A member may refer to, for example, security modules and/or other operational components of a domain by the domain token 600.

The domain trust 602 may also include information defining or otherwise specifying (e.g., by reference to information outside of the domain token) a set of quorum rules which is a set of one or more rules defining conditions on how the domain trust 602 may be updated by operators identified in the domain trust 602. A quorum rule, for example, may specify that authorization by a minimum number of operators is required before changing the domain trust 602, that is, updating the domain trust 602 to a newer version. Quorum rules may also be more complex. For example, different operators may have different statuses and quorum rules may define complex conditions whereby, for instance, authorization by a minimum number of a certain status of operator is required and authorization by a different number of operators of a different status is required for changing the domain trust. Various conditions may also be formed through Boolean operators such as "AND" or "OR." Generally, in various embodiments, any way by which conditions are encodable may be encoded as quorum rules in the domain trust 602.

As noted, domain trust information may identify a current version of the domain trust 602 where, in some embodiments, the domain trust version is updated sequentially using integer values (although other ways of identifying versions are also considered as being within the scope of the present disclosure). Various types of information may be provided with the domain token 600 for the purpose of data security. For example, an embodiment of the domain token 600 includes a digital signature 604 generated by a security module that generated the domain token 600. Similarly, the domain trust itself may have a digital signature 606 generated by the security module that generated the domain trust 602. (It should be understood that, if stated that the domain trust includes the digital signature 606, only a portion (e.g., all of the domain trust 602 except for the digital signature and/or possibly some metadata which may identify the security module that generated the digital signature to enable verification of the digital signature using an appropriate public key) of the domain trust 602 would be digitally signed.) It should be noted that the security module that generated the domain trust may be a different security module or the same security module as that which generated the domain token 600. Generally, for example, the domain token may be updated at a frequency that is different than a frequency at which the domain trust 602 is updated. For example, as a result of key rotation requirements, the domain token 600 may be updated more frequently than the domain trust which may be a more stable set of information which changes less frequently. The signature 604 of the domain token 600 may be generated in various ways in accordance with various embodiments. For example, a security module may generate a digital signature using a private key of a public private key pair so as to be verifiable using a public key which may be provided in the domain token 600. Other information such as information identifying a component of the domain that generated the signature may also be included, although such information is not illustrated in the figure.

As illustrated by the lock icon in FIG. 6, the domain token may also be encrypted. The domain token may be encrypted so as to be decryptable by the security modules identified in the domain token 600. In some embodiments, for example, the domain token is encrypted using a secret shared among the security modules identified in the domain token 600. As another example, the domain token may include the information described above repeated for each security module identified in the domain token. Each redundant copy, however, may be encrypted using a different public key of a different security module so that a security module may select a copy of the information encrypted under its public key and use its corresponding private key to decrypt the domain token. As yet another example, the domain token may be encrypted using a cryptographic key and a copy of the cryptographic key may be encrypted under each public key of each security module identified in the domain token (e.g., in the domain trust 602). The encrypted copies of the cryptographic key may be passed with the domain token as part of the domain token or separate therefrom. If part of the domain token, it would be understood that only a portion of the domain token would be encrypted. Similarly, a digital signature 606 may be generated using only a portion of the domain token 600 so that the domain token can be said to include the digital signature. Generally, any way by which the domain token 600 may be encrypted so as to be decryptable by security modules identified in the domain defined by the domain token 600 is considered as being within the scope of the present disclosure.

Variations of the domain token 600 and/or domain trust 602 are considered as being within the scope of the present disclosure. For example, a domain trust may include an attestation or portion thereof to enable verification of the attestation to check that a security module that authorized the domain trust was in an authorized state when authorizing the domain trust. Further, as noted above, if the domain trust 602 is an initial domain trust for a cryptographic domain, the domain trust 602 may not identify a set of members. A quorum identified in the initial domain trust may be required to authorize the addition of one or more members (security module(s)). Such additions may be made by an operator quorum-authorized command to a security module to add the one or more members, which may result in the security module generating a new domain token with an updated domain trust that lists the added one or more members. In some embodiments, operators are required to verify a state of a security module being added by cryptographically verifying a remote attestation generated by a security module to be added, where the remote attestation may be generated by a trusted platform module (TPM) or other cryptographic module of the security module. The remote attestation may include one or more cryptographic hashes of application code, operating system code, and/or firmware of the security module. In this manner, an operator can prevent adding security modules whose code is in an unauthorized state. In some embodiments, update of a domain trust requires verification of a remote attestation by a quorum of operators before the security module can be added to a domain trust (i.e., specified in a version of a domain trust).

The cryptographic module, which may be a trusted platform module (TPM) may include a memory subsystem, including a main random access memory (RAM) for storage of instructions and data during program execution and a read only memory (ROM), in which fixed cryptographic information may be stored, such as a hardware secret stored securely within the cryptographic module so as to be non-exportable (i.e., inaccessible through any call to the cryptographic module). The cryptographic module, in some embodiments, operates wholly or partly in compliance with Trusted Computing Group's TPM Main Specification level 2, Version 1.2, Revision 116, TPM Main Specification level 2, Version 1.2, Revision 133 and/or ISO/IEC 11889, which are incorporated herein by reference. The cryptographic module may also store cryptographic keys in RAM and/or processor registers for temporary cryptographic processing. The cryptographic information stored in memory may be used in combination with cryptographic information obtained via a network interface. The one or more cryptographic processors may be used to perform cryptographic operations, such as described above, in the device and may include a random number generator, SHA-2 or other hash generator and an encryption-decryption-signature engine.

As noted above, in various embodiments of the present disclosure, cryptographic modules (including TPMs and security modules) may be configured with hardware secrets that are securely stored within hardware. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 7:
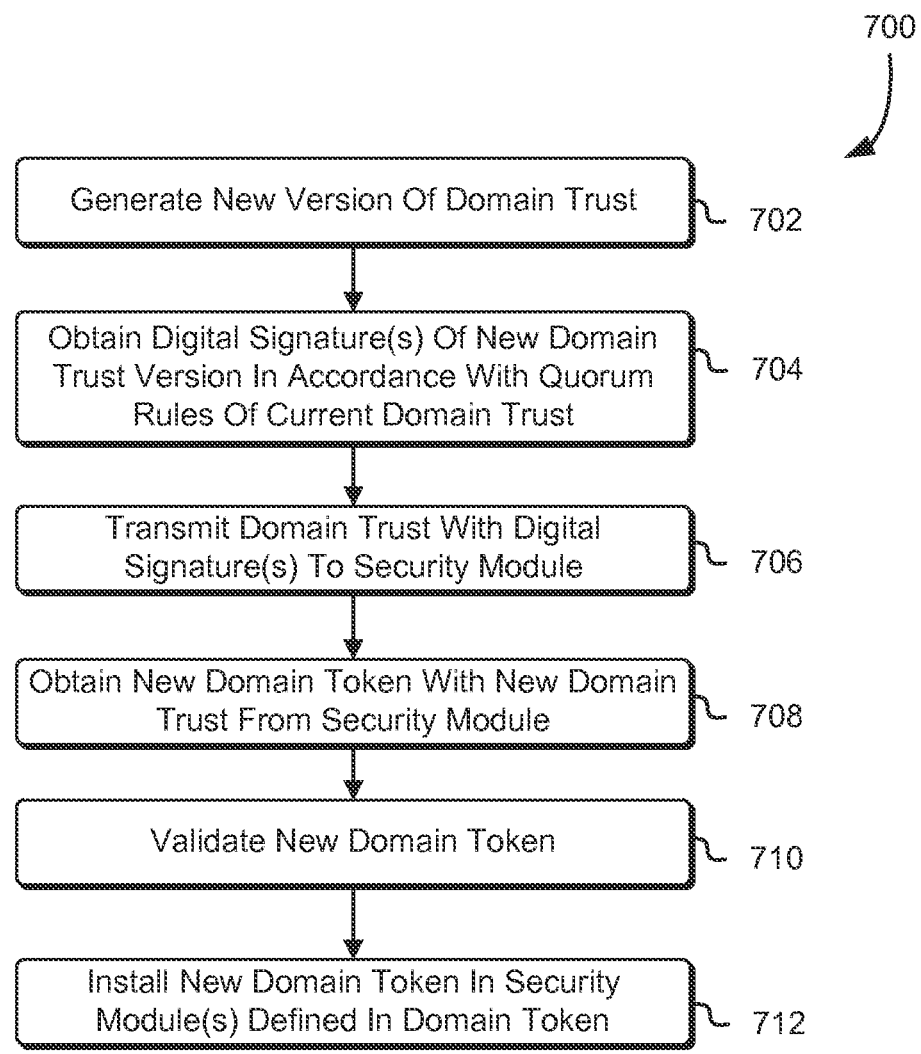
FIG. 7 shows an illustrative example of a process for installing a new domain token in accordance with at least one embodiment.

FIG. 7 shows an illustrative example of a process 700 for updating a domain trust in accordance with an embodiment. The process 700 may be performed by any suitable system such as by an operator described above. In an embodiment the process 700 includes generating 702 a new version of a domain trust. The generated 702 new version may include information such as described above where the information may differ from a current version of the domain trust in one or more aspects. The new version may, for example, have one or more additional operators, one or more additional members, may lack one or more operators that are in the current domain trust, lack one or more members that are in the current domain trust, may have changed quorum rules and/or otherwise may be different. In some embodiments, such as when the domain trust is an initial domain trust, the new domain trust may not specify any members (security modules).

Once the new version of the domain trust has been generated, one or more digital signatures of the new domain trust version may be obtained 704, where the signatures are obtained to be in compliance with quorum rules of a current domain trust. Obtaining 704 the digital signatures may include digitally signing the new domain trust version and/or transmitting the new domain trust version to other operators to be digitally signed. Each operator that signs the new version of the domain trust may do so using a private key of a public private key pair corresponding to the operator, although other ways of generating digital signatures are also considered as being within the scope of the present disclosure. In some embodiments, each operator of a set of operators sufficient to comply with quorum rules of a current domain trust digitally signs the new version of the domain trust. In other examples, more complicated ways of obtaining the digital signatures may be used. For example, a first operator may digitally sign the domain trust and the combination of the domain trust with the digital signature generated by the first operator may be digitally signed by a second operator to generate a digital signature of both the domain trust and the first digital signature. That set of information may be digitally signed by another operator and so on. Generally, any way by which digital signatures of operators in compliance with quorum rules may be obtained or considered as being within the scope of the present disclosure. Generally, cryptographic proof of compliance with current quorum rules may be made in any manner by which a security module or other device would be able to verify the cryptographic proof when its operation is reliant thereon.

In an embodiment, when a sufficient set of digital signatures has been obtained 704 to be in compliance with quorum rules of a current domain trust, the process may include transmitting 706 the domain trust with the one or more digital signatures to a security module. The security module may be selected as a security module within the current domain. Further, the domain trust with one or more digital signatures may be transmitted 706 directly to the security module or through another entity such as through a security module coordinator, also referred to as a coordinator module, such as described above and in more detail below. The security module that receives the domain trust that was transmitted 706, may use the new domain trust version to generate a new domain token with the new domain trust. The security module, for example, may replace the current domain trust with a new domain trust and a current domain token, encrypt and digital sign the new domain token. This may increment a version of both the domain token and the domain trust while changes to the domain trust outside of the domain trust may cause an increment only to the domain trust and not to the domain token. It should be noted that the domain token may be encrypted then digitally signed, or digitally signed and then encrypted. In other words, the digital signature may be generated based at least in part on the domain token in plain text form and/or the domain token in cyphertext form.

Accordingly, when the security module has generated the new domain token, the process 700 may include obtaining 708 the new domain token with the new domain trust from the security module that generated the new domain token. Transmission of the domain trust to the security module may be performed directly or indirectly, i.e., through another component of a distributed system. Obtaining 708 the new domain token may be performed by receiving the new domain directly from the security module that generated the new domain token or indirectly, such as through a security module coordinator. In an embodiment, the process 700 includes validating 710 the new domain token that was obtained 708. Validating the new domain token may include, for example, verifying a digital signature of the new domain token that was generated by the security module that generated the new domain token. Validating 710 the new domain token may be performed, for example, by using a public key of a public private key pair corresponding to the security module that generated the new domain token to verify the digital signature of the new domain token. On a condition that the new domain token has been successfully validated 710 the process 700 may include installing 712 the new domain token in one or more security modules defined in the domain token. Installing 712 the new domain token may be performed in any suitable manner, such as by transmitting the new domain token to the one or more security modules and/or by transmitting the new domain token to a security module coordinator that will perform a process of propagating the new domain token to the security modules.

Numerous variations of the process 700 are considered as being within the scope of the present disclosure. For example, as noted, the contents of a domain trust may vary depending on whether the domain trust is an initial domain trust or an intermediate version domain trust. Further, security modules may be configured such that, when an initial domain trust is generated, a command to issue the domain trust (e.g., make active) requires authorization by a quorum of operators, as defined by the domain trust. Further, before a command to issue a domain trust is issued, an operator may be required to verify a remote attestation of the security module's executable code generated by a cryptographic module (e.g., TPM) of the security module to which the command is to be issued. The operator may avoid issuing a command to a security module that does not provide a valid remote attestation (either by not providing an attestation or by providing an invalid one), thereby preventing a situation where a compromised security module issues a domain token with unauthorized information (e.g., a domain key that is also stored by an unauthorized computer system). Other variations are also considered as being within the scope of the present disclosure.

Figure 8:
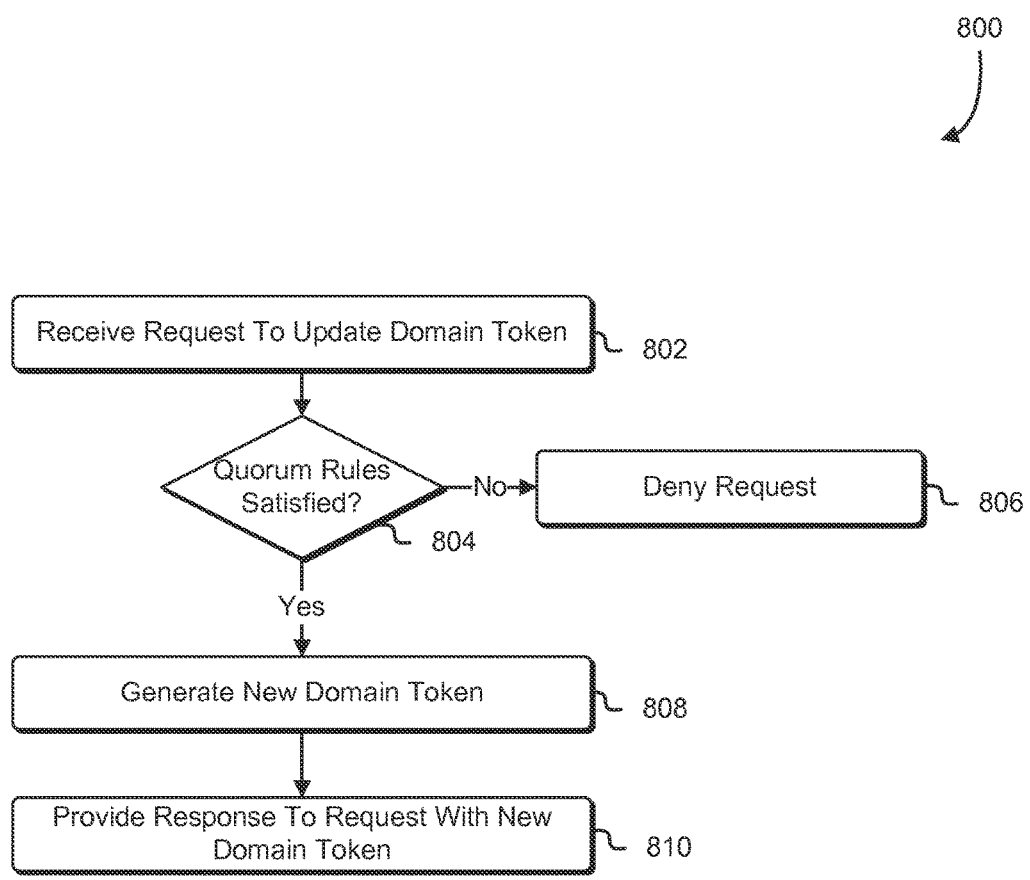
FIG. 8 shows an illustrative example of a process for generating a domain token in accordance with at least one embodiment.

FIG. 8 shows an illustrative example of a process 800 which may be used to update a domain trust and generally to update a domain token in accordance with an embodiment. In an embodiment, the process 800 may be performed by any suitable system such as by a security module such as described above and in more detail below. In an embodiment, the process 800 includes receiving 802 a request to update a domain token. The request 802 may be a request transmitted over a network to the system performing the process 800. Upon receiving the request, the system performing the process 800 may determine 804 whether quorum rules have been satisfied. As discussed above, a system performing the process 800 may operate in accordance with a domain trust of a particular version which may be the latest version verified by the system performing the process 800. The system performing the process 800 may determine 804 whether the quorum rules of that domain trust are satisfied. Determining whether the quorum rules are satisfied may include evaluating whether a set of operators authorizing the update satisfies the quorum rules. In addition, determining whether the quorum rules are satisfied may also include verifying one or more digital signatures provided with the request to update the domain token to cryptographically verify that the update has been authorized by the set of operators purported to have authorized the update. As noted above, the digital signatures may be of a new domain trust such as when the request to update a domain token is received in order to update a domain trust. In some examples, such as when the domain trust is an initial domain trust, quorum rules for an issuance of a command to issue the domain trust may be checked in addition to or instead of checking quorum rules for the domain trust. For instance, in some examples, the command to issue a domain trust may contain a domain trust and, as a result, a digital signature of the command serves as authorization by the signing system for both the command and the domain trust, although commands and domain trusts may be separately signed in some embodiments.

If it is determined 804 that the quorum rules are not satisfied, the request may be denied 806. Denying the request may include transmitting a response to the request that indicates the denial. The request may be denied in other ways such as simply by performing no action and/or by providing a reason for the denial. Other variations are also considered as being within the scope of the present disclosure. If it is determined 804 that the quorum rules are satisfied, the process 800 may include generating 808 a new domain token. The new domain token may include information such as described above, including a new version of the domain trust (i.e., the version of the domain trust included in the request or, in alternate embodiments, a new domain token generated by the system performing the process 800 that generated the new domain token in accordance with parameters (e.g., members, operators, and/or quorum rules) specified in the request). Further, generating 808 the new domain token may include encrypting and digitally signing the new domain token such as described above. In an embodiment, once the new domain token has been generated 808, a system performing the process 800 provides 810 a response to the request with the new domain token. A receiver of the response to the request may then cause the new domain token to be propagated to security modules identified in a cryptographic domain defined by the new domain token such as described above.

Figure 9:
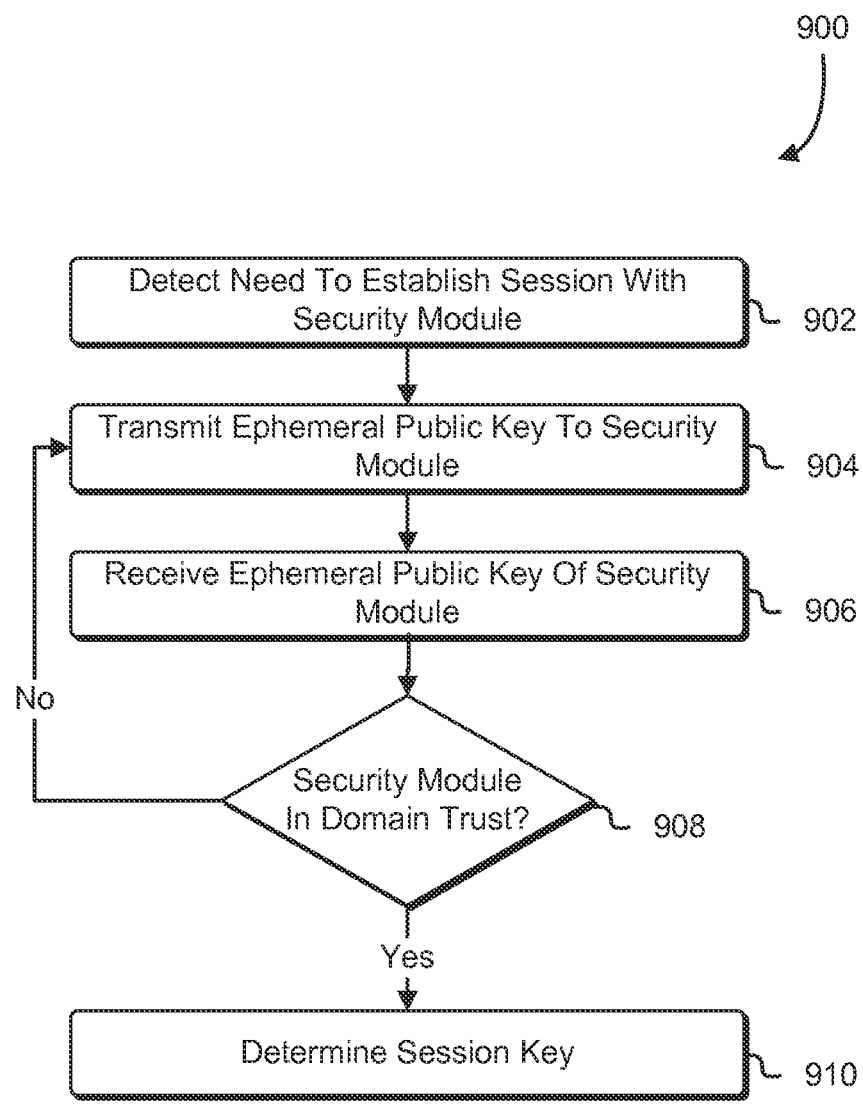
FIG. 9 shows an illustrative example of a process for determining a session key in accordance with at least one embodiment.

As noted above, domain trusts may be used in various ways in accordance with various embodiments. In some embodiments, at least some communication between nodes of the distributed system is required to be secure. In some embodiments, sessions are established in order to enable secure communication between nodes of the distributed system. FIG. 9 shows an illustrative example of a process 900 for determining a session key which may be used to encrypt communications for a session. The process 900 may be performed by any suitable system such as by a caller of a security module coordinator and/or generally any device configured to securely communicate with a security module. In an embodiment, the process 900 includes detecting 902 a need to establish a session with a security module. In some embodiments, expiration of a previous session may trigger detection 902 of the need to establish the session with the security module. In other embodiments, operation of a system performing the process 900 may detect 902 the need to establish the session with the security module as a result of detecting a need to cause the security module to perform one or more cryptographic operations. As an example, a security module service consumer which may perform the process 900, may have itself received a request whose fulfillment requires one or more cryptographic operations performed by a security module. As a result of receiving the request the consumer may detect whether it has an existing session and, if not, detect 902 a need to establish a session with the security module. Generally, the need to establish the session may be detected 902 in various ways in accordance with various embodiments.

Upon detecting 902 a need to establish a session with the security module, the process 900 may include performing a secure key exchange, such as a Diffie-Hellman key exchange, operations of which are discussed below. In particular, the process 900 may include transmitting 904 an ephemeral public key to the security module. Communications between the system performing the process 900 and a security module and/or information contained in the communications (e.g., cryptographic keys) may be digitally signed using private keys of the respective signing systems to enable validation of the communications and information contained therein, although the details of the digital signatures and their verification are omitted from the figure for the purpose of avoiding obfuscation. The ephemeral public key may correspond to a private key generated and maintained securely by the system performing the process 900. As a result of transmission 904 of the ephemeral public key, the security module may generate or otherwise obtain an ephemeral public key which it may transmit to the system performing the process 900. Accordingly, the process 900 may include receiving 906 an ephemeral public key of the security module.

It should be noted that in various embodiments a system performing the process 900 may lack the ability to select a specific security module. For example, security modules may from the perspective of a system performing the process 900, be situated in a distributed system behind a load balancer configured to distribute requests among multiple security modules. Accordingly, in some embodiments a system performing the process 900 verifies that it is able to trust a security module that responded to its transmission 904 of the digitally-signed ephemeral public key. In an embodiment as illustrated in FIG. 9, the system performing the process 900 verifies the ability to trust the security module by determining 908 whether the security module is in a current domain trust where a current domain trust is a latest version of a domain trust verified by the system performing the process 900. It should be noted, however, that such verification may occur in embodiments when the security module is not behind a load balancer.

If it is determined 908 that the security module is not in a domain trust, various operations may be performed in accordance with various embodiments. For example, a process of which the process 900 is a sub-process may simply fail. However, in other embodiments as illustrated in FIG. 9, an ephemeral public key may be transmitted 904 to another security module. The other security module may be selected explicitly or, in some embodiments, not explicitly. For example, in embodiments where a security module sits behind a load balancer from the perspective of a system performing the process 900, the ephemeral public key may be repeatedly retransmitted until a security module in the current domain trust responds with an ephemeral public key of that security module. The load balancer may use probabilistic, round-robin and/or other techniques for distributing the transmitted ephemeral public key. Once it is determined 908 that the security module that responded with an ephemeral public key of that security module, the process 900 may include determining a session key. The session key may be determined using techniques of a Diffie-Hellmann ephemeral key exchange, that is, using the received ephemeral key and its own private key. Generally the process 900 may be adapted to use any secure key exchange in order to determine a session key that may be used to establish secure communications with a security module.

Figure 10:
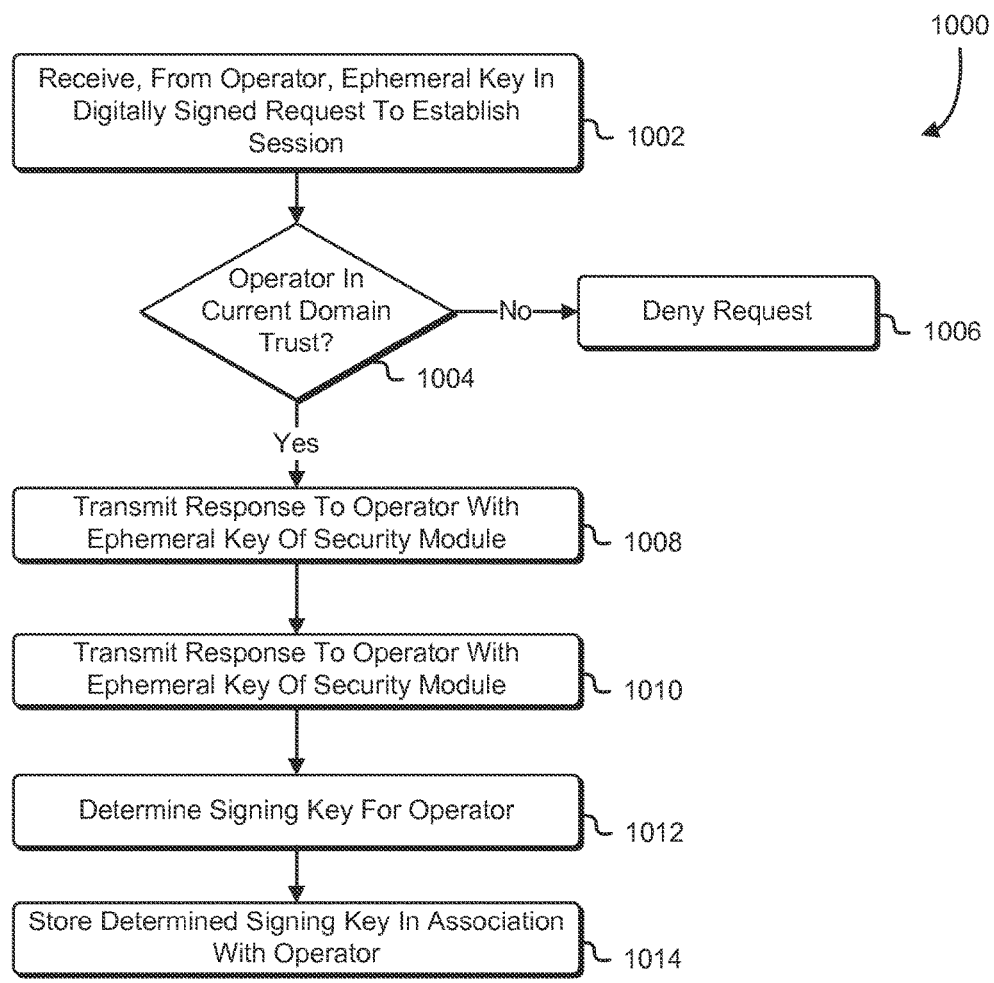
FIG. 10 shows an illustrative example of a process for determining a session key in accordance with at least one embodiment.

FIG. 10 shows an illustrative example of a process 1000 for determining a session key. The process 1000 may be performed by any suitable system such as by a security module discussed above and in more detail below. The process 1000 may be performed as a result of performance of the process 900 described above and, generally, interactively with another system performing the process 900. In an embodiment, the process 1000 includes receiving 1002 from an operator an ephemeral key in a request to establish a session, which may be digitally signed and/or of which a portion may be digitally signed (e.g., an ephemeral key may be digitally signed). The request may be, for example, a request that provided an ephemeral public key in operation 904 described above in connection with FIG. 9. A system for forming the process 1000 may determine 1004 whether the operator is in a current domain trust where the current domain trust is the latest version verified by the system performing the process 1000. If it is determined that the operator is not in the current domain trust, the process 1000 may include denying 1006 the request such as described above. If however it is determined 1004 that the operator is in a current domain trust, the process 1000 may include transmitting 1008 a response to the request to the operator with an ephemeral key of the security module. The response and/or the ephemeral key may be digitally signed to enable the operator to verify the digital signature thereby validating authenticity of the response and/or ephemeral key of the security module. The process 1000 may also include determining 1012 a signing key for the operator using the ephemeral key of the operator provided from the received 1012 request. As discussed above, the signing key for the operator may be determined in accordance with a Diffie-Hellman exchange process being performed as part of the process 1000. The signing key for the operator that has been determined may be stored 1014 in association with the operator such that if or when the operator transmits information such as requests to the system performing the process 1000, the system performing the process 1000 may access the signing key and verify the digital signature to verify authenticity of the request and operate accordingly, such as by fulfilling requests when the digital signature is valid and denying requests if the digital signature is determined to not be valid.

Figure 11:
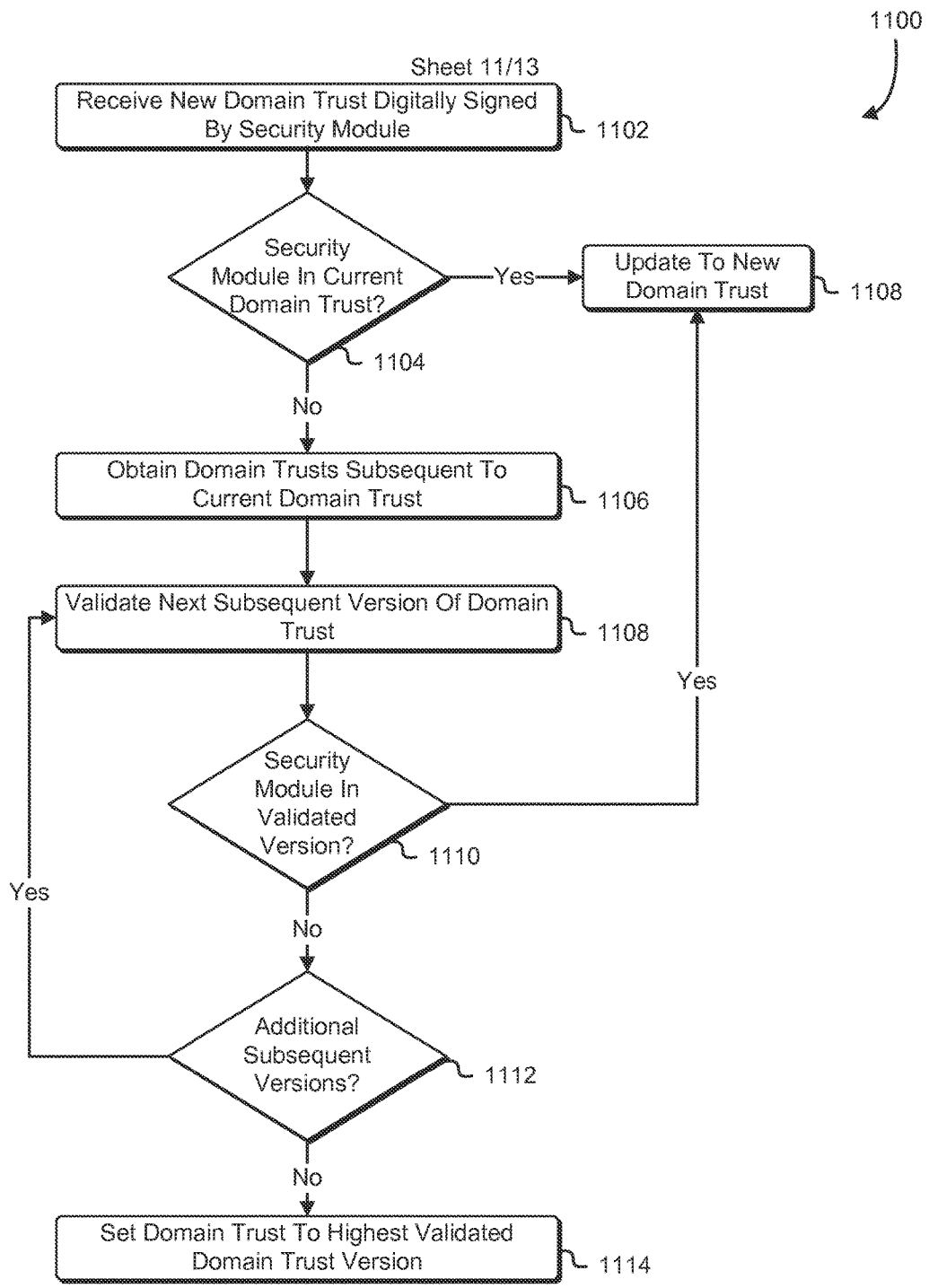
FIG. 11 shows an illustrative example of a process for updating a domain trust in accordance with at least one embodiment.

As discussed, various security measures may be implemented to ensure a high level of security and generally to ensure that unauthorized domain trusts are not installed. FIG. 11 shows an illustrative example of the process 1100 for updating a domain trust in accordance with an embodiment. The process 1100 may be performed by any suitable system and generally such as by any system that utilizes a domain trust such as an operator device, security module, a consumer of a security module coordinator and/or generally any device in a distributed system that utilizes domain trusts. As illustrated in FIG. 11 the process 1100 includes receiving 1102 a new domain trust digitally-signed by a security module. In some embodiments the domain trust is received in a domain token although in some embodiments domain trusts may be transferred and/or generally utilized separately. The new domain trust may be received in a variety of contexts. For example, communications between nodes of a distributed system may identify domain trusts used by the respective nodes. The communications may include the domain trust or differences in identified domain trusts may trigger obtaining a domain trust from another system. Generally, the new domain trust may be received in any suitable manner.

As illustrated in FIG. 11 the process 1100 includes determining 1104 whether the security module that digitally signed the new domain trust is in the current domain trust. If it is determined 1104 that the security module that digitally signed the new domain trust is in the current domain trust the process 1100 may include updating 1108 to the new domain trust. If however it is determined 1104 that the security module that digitally signed the new domain trust is not in the current domain trust, the process 1100 may include obtaining 1106 a set of domain trusts subsequent to the current domain trust. In some embodiments the domain trusts are stored in a database or other data storage system in a location in a distributed system accessible to nodes that may require use of domain trusts. In some examples, domain trusts are stored in a separate data storage service and obtaining the domain trust may be performed by submitting one or more application programming interface (API) calls to the data storage service to retrieve the domain trusts. Generally, any way by which the domain trusts may be retrieved may be used.

As illustrated in FIG. 11, the process 1100 includes validating 1108 the next subsequent version of the domain trust where the next subsequent version may be the immediately subsequent version in a series of domain trusts. A determination may be made 1110 whether the security module that digitally signed the new domain trust is in the validated domain trust version. If it is determined 1110 that the security module is in the validated version of the domain trust, the process 1100 may include updating to the new domain trust 1108 such as described above. If however it is determined that the security module is not in the validated version of the domain trust, the process 1100 may include determining 1112 whether there are any additional subsequent versions. If it is determined 1112 that there are no additional subsequent versions, the process 1100 may include setting 1114 the domain trust to the highest validated domain trust version. Thus a system performing a process 1100 may operate in accordance with the set domain trust. For example, if a system that performed the process 1100 received a result of a cryptographic operation (e.g., a ciphertext, a plaintext, of digital signature) generated by a security module absent from the highest validated domain trust version, the system may reject the received result of the cryptographic operation (and perhaps attempt to obtain a result from another security module that is specified in the highest validated domain trust version). As another example, in some embodiments, a system that has performed the process 1100 may replace information corresponding to a previous domain trust version with information corresponding to the highest validated domain trust version. In some examples, such a system utilizes a configuration file or other collection of configuration information and, as a result of updating to a newer version of a domain trust, ceases using the previous version of the domain trust. In this manner, if the newer version of the domain trust results in removal of a member/operator of a cryptographic domain, the system may be operable to reject results of cryptographic operations and/or other information from such members/operators that have been removed from the cryptographic domain.

If it is determined 1112 that there are additional subsequent versions, the process 1100 may include validating 1108 the next subsequent version of the domain trust and determining whether the security module is in that validated version such as described above. As illustrated in FIG. 11, this portion of the process 1100 may repeat until it is determined 1110 that a security module is in a validated version of the domain trust. In this manner, a chain of domain trusts where each domain trust is used to verify another domain trust is formed. Except for an initial domain trust in the chain (which may be verified another way, such as described above) is verifiable by starting with a trusted (e.g., cryptographically verified) domain trust and verifying successive domain trusts until criteria for trusting a domain trust are satisfied. At this point, the process 1100 may include updating two of the new domain trusts by setting the new domain trust as the current domain trust.

Numerous variations are considered as being within the scope of the present disclosure. For example, FIG. 11 illustrates a process by which subsequent versions of a domain trust are accessed and then processed sequentially. The process 1100 may be modified so that the domain trusts are validated sequentially and also accessed sequentially as needed. As noted above in other embodiments, the process 1100 may be adapted such that each immediate subsequent version must be validated until reaching the new domain trust that was received 1102. In this manner, there is greater security that the security module that digitally signs the new domain trust is actually in a version of that new domain trust that immediately precedes the received 1102 new domain trust. Further, as another example of a variation of the process 1100 considered as being within the scope of the present disclosure, the process 1100 as illustrated shows a process by which a system performing the process 1100 updates to a later version of the domain trust as long as it is able to validate that later version of the domain trust and regardless of whether it ultimately updates the new domain trust that was received 1102. In other embodiments however, such an update may not occur and a system performing the process 1100 may simply remain with the current domain trust unless it is able to validate the new domain trust that was perceived 1102.

Other variations are also considered as being within the scope of the present disclosure. For example, the above description focuses on domain trusts and domain tokens for the purpose of illustration. However, the techniques described above may be adapted for use in other contexts. For example, the techniques described above may be adapted for use generally with configuration information (and information in general) utilized by multiple nodes in a distributed system, where the configuration or other information is not necessarily information that defines a cryptographic domain. In particular, the techniques described above may be used to enable a node in a distributed system to validate updated information and, as a result of successful validation, operate in accordance with the updated information.

Figure 12:
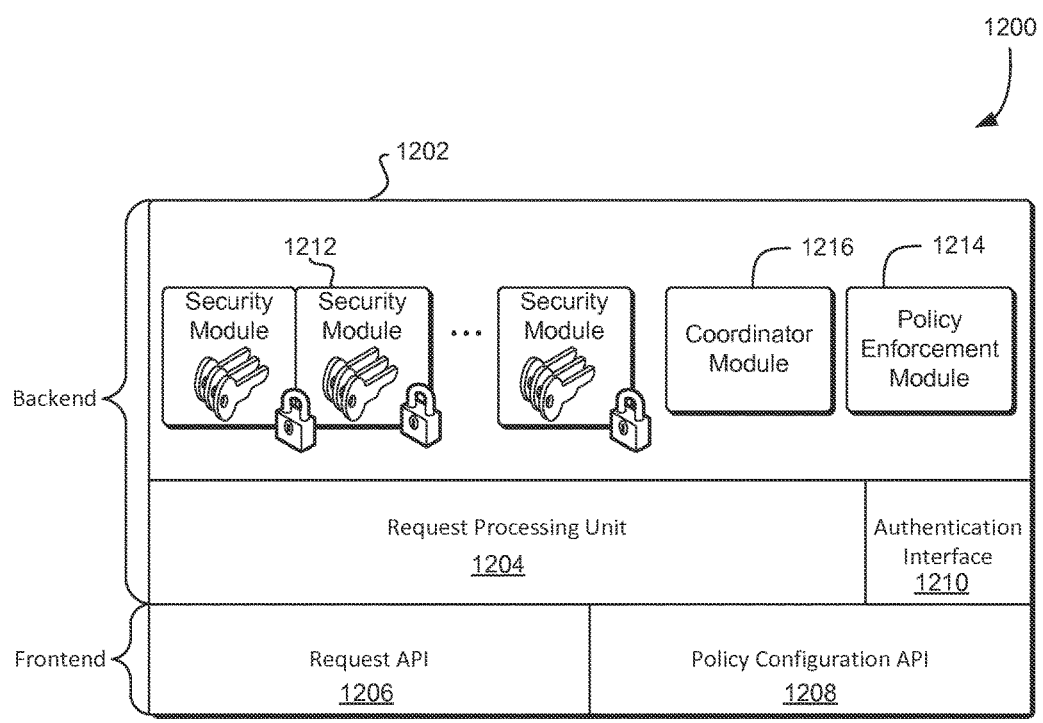
FIG. 12 shows an illustrative example of a cryptography service in accordance with at least one embodiment.

As discussed above, various embodiments of the present disclosure are directed to providing cryptography services. Cryptography services may be provided by a cryptography service system such as described above. FIG. 12 accordingly shows an illustrative example of a cryptography service 1200 in accordance with various embodiments. As illustrated in FIG. 12 and as discussed above, the cryptography service 1200 is logically comprised of a frontend system and a backend system. Both the frontend system and the backend system may be implemented by one or more computer systems configured to perform operations described herein. For example, as illustrated in FIG. 12, the frontend system of the cryptography service 1200 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
  CreateKey(KeyID)
  Encrypt(KeyID, Data, [AAD])
  Decrypt(KeyID, Ciphertext, [AAD])
  Shred(KeyID)
  ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeroes or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

As illustrated in FIG. 12, the cryptography service 1200 includes a backend system 1202 that itself comprises various components in some embodiments. For example, the backend system in this example includes a request processing system (unit) 1204 which may be a subsystem of the cryptography service 1200 that is configured to perform operations in accordance with requests received through either the request API 1206 or the policy configuration API 1208. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 1210 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1200 also, in this illustrative example, includes a plurality of a security modules 1212 (cryptography modules), a policy enforcement module 1214, and a coordinator module 1216. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 1200 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1200 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 12 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 13:
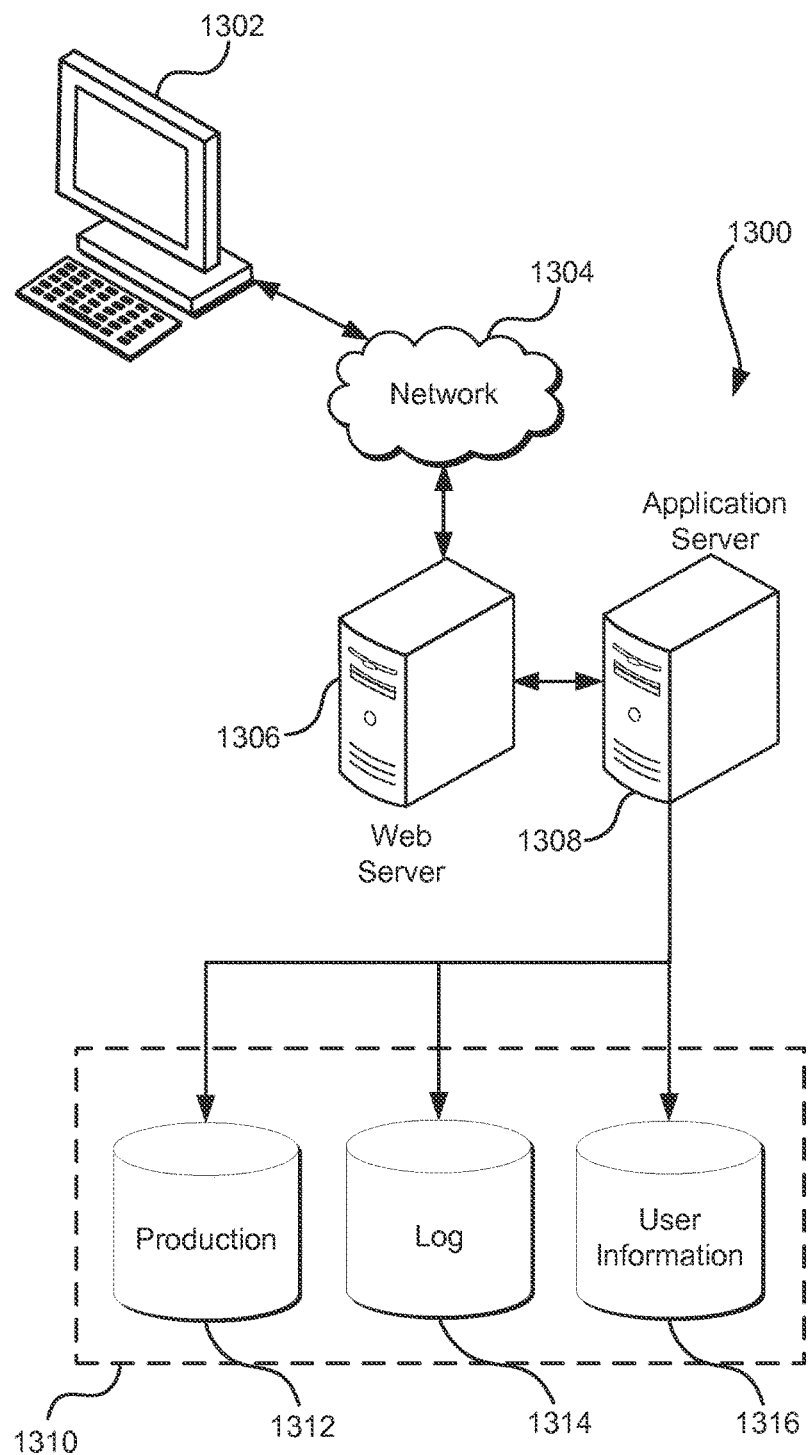
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining an initial version of a domain trust and a digital signature of the initial version of the domain trust, the initial version specifying a set of operators and a set of quorum rules, the quorum rules specifying one or more conditions for subsets of the set of operators being authorized to create a new domain trust, the digital signature having been generated by a root of trust;
    determining, based at least in part on the digital signature and a cryptographic key associated with the root of trust, whether the digital signature was generated by the root of trust;
    receiving a command to create a second version of the domain trust, the second version of the domain trust specifying a second set of operators, a second set of quorum rules, and a set of security modules;
    determining whether the command was authorized by a subset of the set of operators that satisfies the set of quorum rules specified by the initial version of the domain trust;
    as a result of determining that the digital signature was generated by the root of trust and that the new domain trust was authorized by the subset of the set of operators that satisfies the set of quorum rules, using a second cryptographic key to generate a digital signature of the second version of the domain trust, the second cryptographic key being such that the digital signature is usable by a first security module in the set of security modules to cryptographically verify that the second version of the domain trust was authorized by a security module root of trust; and
    providing the second version of the domain trust and the digital signature of the second version of the domain trust to enable performance of cryptographic operations in accordance with the second version of the domain trust by a second security module specified in the second version of the domain trust.

2. The computer-implemented method of claim 1, wherein:
    the method further comprises providing an attestation of executable code, the attestation generated using a third cryptographic key associated with a second root of trust; and
    providing the attestation enables the command to be transmitted by a computer system that operates with successful validation of the attestation as a condition precedent to transmission of the command.

3. The computer-implemented method of claim 1, wherein determining whether the command was authorized by a subset of the set of operators that satisfies the set of quorum rules specified by the initial version of the domain trust comprises verifying multiple digital signatures each corresponding to a respective operator of the set of operators.

4. A system, comprising one or more processors and memory including instructions that, when executed by the one or more processors, cause the system to:
  implement a first computer system, the first computer system configured to:
    obtain an initial version of a domain trust, the initial version of the domain trust being cryptographically verifiable as authorized by a root of trust and specifying a first set of conditions for executing a command to create another version of the domain of trust, authorization by a quorum of operators satisfying one or more of the first set of conditions for executing the command, and the quorum of operators comprising a plurality of operators;
    cryptographically verify that the initial version of the domain trust was authorized by the root of trust;
    verify that the first set of conditions for executing the command are satisfied; and
    as a result of the first set of conditions for executing the command being satisfied, create a second version of the domain trust, the second version of the domain trust specifying a second set of conditions for participation in a distributed system.

5. The system of claim 4, wherein the instructions, when executed by the one or more processors, further-cause the system to use the second version of the domain trust to verify, without a cryptographic key associated with the root of trust, validity of another version of the domain trust subsequent to the second version of the domain trust.

6. The system of claim 4, wherein the instructions, when executed by the one or more processors, further-cause the system to:
  after creating the second version of the domain trust, receive a command to install the second version of the domain trust; and
  fulfill the received command by reconfiguring to operate in accordance with the second version of the domain trust.

7. The system of claim 4, wherein the distributed system implements a cryptographic domain.

8. The system of claim 4, wherein the created second version of the domain trust is cryptographically verifiable as authorized by the first computer system.

9. The system of claim 4, wherein the set of conditions for creating another domain trust comprise one or more conditions specifying entities authorized to issue a command to create the other domain trust.

10. The system of claim 4, wherein satisfaction of the set of conditions requires authorization by a subset of a set of operators that forms a quorum of operators defined by the set of conditions.

11. The system of claim 4, wherein the initial version of the domain trust is obtained from an operator specified in the initial version of the domain trust.

12. The system of claim 4, wherein the system further comprises a set of operator computer systems specified by the initial version of the domain trust and at least a subset of the operator computer systems in compliance with the set of conditions is authorized to cause creation of the other domain trust.

13. The system of claim 4, wherein:
  the first computer system is configured to cause a cryptographically verifiable attestation of executable code of the first computer system to an operator computer system of the operator computer system; and
  the operator computer system is configured to require successful verification of the attestation to issue a command to cause creation of the domain trust.

14. The system of claim 4, wherein the other version of the domain trust specifies a set of security modules authorized to perform cryptographic operations.

15. The system of claim 4, wherein the first computer system is further configured to, as a result of the set of conditions for creating another domain trust being satisfied, create a domain token that includes a set of cryptographic keys.

16. One or more non-transitory computer-readable storage media having stored thereon executable instructions that, when executed by one or more processors of a computer system, cause the computer system to at least:
  receive an attestation of at least executable code utilized by a security module, the attestation chaining to a root of trust;
  cryptographically verify, based at least in part on a cryptographic key associated with the root of trust, that the attestation indicates a valid state of the security module;
  as a result of cryptographically verifying that the attestation indicates the valid state of the security module, obtain authorization from a quorum of operators to create a domain, the quorum defined by a set of conditions specified in an initial version of a domain trust stored by the security module; and
  cause the security module to use the initial version of the domain trust to determine whether to perform an operation.

17. The one or more non-transitory computer-readable storage media of claim 16, wherein:
  the instructions that cause the computer system to cause the security module to use the initial version of the domain trust to determine whether to perform an operation, when executed by the one or more processors, cause the computer system to transmit a command and cryptographic proof of authorization by the quorum of the command to the security module; and
  the operation comprises fulfillment of the command.

18. The one or more non-transitory computer-readable storage media of claim 16, wherein the instructions further comprise instructions that, when executed by the one or more processors, cause the computer system to provide the initial version of the domain trust to the security module.

19. The one or more non-transitory computer-readable storage media of claim 18, wherein the initial version of the domain trust is cryptographically verifiable using a cryptographic key associated with a second root of trust different from the root of trust.

20. The one or more non-transitory computer-readable storage media of claim 16, wherein:
  the instructions that cause the computer system to obtain authorization from the quorum of operators to create the domain, when executed by the one or more processors, cause the computer system to obtain a set of digital signatures comprising a digital signature from each operator of the quorum of operators; and
  the authorization is based at least in part on the obtained set of digital signatures.

21. The one or more non-transitory computer-readable storage media of claim 16, wherein creation of the domain includes creation of a new version of the domain trust cryptographically verifiable using a cryptographic key associated with the security module.

22. The one or more non-transitory computer-readable storage media of claim 21, wherein the instructions further include instructions that, when executed by the one or more processors, cause the computer system to:
   receive the new version of the domain trust from the security module;
   cryptographically verify the new version of the domain trust based at least in part on the cryptographic key; and
   operate in accordance with whether cryptographic verification of the new version of the domain trust is successful.

23. The one or more non-transitory computer-readable storage media of claim 16, wherein:
   the operation comprises generating a new version of the domain trust; and
   the instructions further include instructions that, when executed by the one or more processors, cause the computer system to provide the initial version of the domain trust and the new version of the domain trust to another security module thereby causing the other security module to use the initial version of the domain trust to determine whether to use the new version of the domain trust.

24. The one or more non-transitory computer-readable storage media of claim 16, wherein is the attestation is generated using a trusted platform module of the security module.

* * * * *